United States Patent
Miyawaki

(10) Patent No.: US 7,242,123 B2
(45) Date of Patent: Jul. 10, 2007

(54) ACTUATOR, LIGHT QUANTITY ADJUSTING APPARATUS, AND STEPPING MOTOR

(75) Inventor: Makoto Miyawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/411,112

(22) Filed: Apr. 26, 2006

(65) Prior Publication Data

US 2006/0186742 A1    Aug. 24, 2006

Related U.S. Application Data

(62) Division of application No. 11/025,949, filed on Jan. 3, 2005.

(30) Foreign Application Priority Data

Jan. 6, 2004   (JP)   ............................. 2004-000796
May 14, 2004   (JP)   ............................. 2004-144377

(51) Int. Cl.
*H02K 37/08*   (2006.01)
*H02K 33/16*   (2006.01)
(52) U.S. Cl. .............................. 310/156.32; 310/49 R; 310/257; 310/268; 310/36; 396/464
(58) Field of Classification Search ............. 310/49 R, 310/90, 156.02, 257, 156.32, 268, 156.36, 310/156.01, 36; 396/463–464
See application file for complete search history.

(56) References Cited

U.S. PATENT DOCUMENTS

| | | | | |
|---|---|---|---|---|
| 3,121,814 A | * | 2/1964 | Kober ................... 310/156.32 |
| 3,181,020 A | * | 4/1965 | Welter ......................... 310/164 |
| 4,113,359 A | * | 9/1978 | Koike et al. ................. 359/230 |
| 4,565,938 A | * | 1/1986 | Fawzy .................... 310/156.69 |
| 4,570,093 A | | 2/1986 | Morii et al. ................... 310/46 |
| 4,772,904 A | * | 9/1988 | Otsuka et al. ............... 396/508 |
| 4,775,813 A | * | 10/1988 | Janson ........................ 310/257 |
| 4,788,464 A | * | 11/1988 | Nishikawa et al. .......... 310/268 |
| 4,918,346 A | | 4/1990 | Tajima et al. ........... 310/156.43 |
| 4,973,869 A | | 11/1990 | Cho ......................... 310/68 B |
| 4,980,590 A | | 12/1990 | Taniguchi et al. ............. 310/81 |

(Continued)

FOREIGN PATENT DOCUMENTS

JP          58-216230     * 12/1983

(Continued)

*Primary Examiner*—Burton Mullins
(74) *Attorney, Agent, or Firm*—Fitzpatrick, Cella, Harper & Scinto

(57) ABSTRACT

An actuator maintains high efficiency, can react to an increase in pole, has a high part fit, and can be manufactured at low cost while it is thinned. The actuator includes a magnet which is formed in a ring shape, in which at least one surface perpendicular to a central axis thereof is divided in a peripheral direction and alternately plane-magnetized in different poles; a stator including a plurality of magnetic pole teeth opposed to the magnetized surface of the magnet; a rotor, which is held to be rotatable about a rotational axis as a center, includes a disk portion whose surface perpendicular to the rotational axis is bonded to the magnet, and is made of a soft magnetic material; and a coil, which is located on substantially the same surface as that of the magnet, is fixed to the stator, and excites the stator and the disk portion.

3 Claims, 17 Drawing Sheets

U.S. PATENT DOCUMENTS

| | | | | |
|---|---|---|---|---|
| 5,945,766 A | 8/1999 | Kim et al. | | 310/268 |
| 6,313,553 B1 * | 11/2001 | Gandel et al. | | 310/36 |
| 6,574,186 B2 * | 6/2003 | Nii et al. | | 369/269 |
| 6,591,066 B2 * | 7/2003 | Aoshima | | 396/133 |
| 6,844,643 B2 | 1/2005 | Aoshima | | 310/112 |
| 6,858,959 B2 * | 2/2005 | Aoshima | | 310/156.32 |
| 6,860,655 B2 * | 3/2005 | Miyawaki | | 396/451 |
| 2002/0127013 A1 * | 9/2002 | Mizumaki et al. | | 396/463 |
| 2003/0062788 A1 * | 4/2003 | Aoshima | | 310/156.32 |
| 2005/0146233 A1 | 7/2005 | Miyawaki | | 310/49 R |

FOREIGN PATENT DOCUMENTS

| | | | |
|---|---|---|---|
| JP | 2-58035 | | 2/1990 |
| JP | 09-201026 | * | 7/1997 |
| JP | 2002-49076 | | 2/2002 |

* cited by examiner

PRIOR ART

ACTUATOR, LIGHT QUANTITY ADJUSTING APPARATUS, AND STEPPING MOTOR

This application is a divisional application of U.S. patent application Ser. No. 11/025,949, filed Jan. 3, 2005, the entire contents of which are incorporated by reference herein.

BACKGROUND OF THE INVENTION

1. Field of the Invention

The present invention relates to an actuator which is suitably mounted as a drive source for a small electronic device such as a camera, a light quantity adjusting apparatus using the actuator, and a stepping motor to which principle of the actuator is applied.

2. Related Background Art

FIG. 18 shows a conventional shutter apparatus for a lens shutter camera.

In FIG. 18, reference 101 denotes a permanent magnet, 102 denotes a driving lever, and 102a denotes a driving pin provided in the driving lever 102. The driving lever 102 is fixed to the permanent magnet 101 and integrally rotates with the permanent magnet 101. Reference numeral 103 denotes a coil and 104 and 105 denote stators which are made of a soft magnetic material and excited through the coil 103. The stator 104 and the stator 105 are connected with each other through portions 104a and 105a, so that the stator 104 and the stator 105 are integrally formed in view of a magnetic circuit. When a current is supplied to the coil 103, the stator 104 and the stator 105 are excited, with the result that the permanent magnet 101 rotates within a predetermined angle range. Reference numerals 106 and 107 denote shutter blades and 108 denotes a base plate having an opening portion 108a. Hole portions 106a and 107a of the shutter blades 106 and 107 are rotatably fit to pins 108b and 108c of the base plate 108. The driving pin 102a is slidably inserted into long holes 106b and 107b of the shutter blades 106 and 107. When the driving lever 102 rotates with the permanent magnet 101, the shutter blades 106 and 107 pivot about the hole portions 106a and 107a, so that an aperture which is not shown is opened or closed.

As another mode, there is also a shutter apparatus having a structure in which a permanent magnet is made of plastic and integrally formed with a driving pin in order to prevent an increase in cost.

Reference numeral 109 denotes a front base plate for holding the shutter blades 106 and 107 so that the blades are movable between the front base plate 109 and the base plate 108. Reference numeral 110 denotes a rear base plate for holding the stators 104 and 105 and holding the permanent magnet 101 so that the magnet is rotatable.

The use of a digital camera has been widely spread. The digital camera performs photoelectric conversion on an image of a field to be imaged using a CCD or the like as an image pickup device and causes a recording medium to record a converted image as still image information. The operation of the digital camera of this type with respect to exposure will be briefly described below.

First, a main power source is turned on before photographing. When the image pickup device becomes an operating state, the shutter blades are held at an open position in which the image pickup device can be exposed. Therefore, the accumulation of charge and the transfer (emission) thereof are repeated in the image pickup device, with the result that the field to be imaged can be observed through an image monitor.

After that, when a release bottom is pressed, a diaphragm value and an exposure time are determined according to an output from the image pickup device at this time. Then, whether or not it is necessary to narrow the diameter of an exposure aperture is determined based on determined results. When it is necessary to narrow the diameter of the exposure aperture, the shutter blades are driven to set a predetermined diaphragm value. Next, an instruction for starting the accumulation of charge (accumulation start signal) is provided to the image pickup device from which the accumulated charge has emitted. Simultaneously, an exposure time control circuit is activated in response to the accumulation start signal serving as a trigger signal. After a lapse of a predetermined exposure time, the shutter blades are driven to a closed position in which exposure to the image pickup device is blocked. After the exposure to the image pickup device is blocked, the accumulated charge is transferred and image information is recorded on a recording medium through an image writing device. The blocking of exposure to the image pickup device during the transfer of charge is intended for preventing a charge quantity from changing by unnecessary light during the transfer of charge.

In addition to the above-mentioned shutter apparatus, there are a shutter apparatus having a mechanism for inserting and removing an ND filter into and from an optical path and a shutter apparatus having a mechanism for inserting and removing a diaphragm regulation member having a small diaphragm diameter into and from an optical path.

In the conventional shutter apparatus, a coil and stators take up a great deal of base plate space. Therefore, it is hard to locate another actuator, a guide rod for a lens, and the like. In view of this point, the following light quantity adjusting apparatus is proposed in Japanese Patent Application Laid-open No. 2002-049076 of the application filed by the present applicant.

FIG. 19 is an exploded perspective view showing a light quantity adjusting apparatus disclosed in Japanese Patent Application Laid-open No. 2002-049076. FIG. 20 is a sectional view showing the light quantity adjusting apparatus shown in FIG. 19 in an axial direction. The light quantity adjusting apparatus includes an actuator serving as a driving device. The actuator has a magnet 201, a coil 202, a stator 203, an auxiliary stator 204, and a blade driving pin 201h. The magnet 201 is rotatable around the center of rotation as an axis and at least the outer peripheral surface thereof is divided in a peripheral direction so as to be alternately magnetized in different poles. The coil 202 is located in the axial direction of the magnet 201. In the stator 203, an outside magnetic pole portion 203a and an inside magnetic pole portion 203b which are excited by the coil 202 are opposed to the outer and inner peripheral surfaces of the magnet 201. The auxiliary stator 204 is fixed to the inside magnetic pole portion 203b of the stator 203 and excited by the coil 202. The blade driving pin 201h is integrally formed with the magnet 201. The light quantity adjusting apparatus further includes a base plate 205 with an opening portion 205a and light quantity control blades 207 and 208. The light quantity control blades 207 and 208 are driven by the blade driving pin 201h of the actuator so as to adjust an opening quantity of the opening portion 205a of the base plate 205. Reference numeral 206 denotes a retaining plate.

When the light quantity adjusting apparatus having the above-mentioned structure is used, the coil and the magnet are located in the axial direction. Therefore, there is a large effect that the light quantity adjusting apparatus becomes a compact apparatus in which the coil and the magnet do not take up a great deal of base plate space.

When an additional reduction in size of a digital camera or the like using the above-mentioned actuator is demanded, it is necessary to achieve slimming of the digital camera in addition to a reduction in size of the actuator itself. However, in the above-mentioned actuator, the coil and the magnet are located in the axial direction. Therefore, extreme slimming is difficult because efficiency of the actuator is likely to reduce owing to a reduction in magnetization efficiency of the magnet in the peripheral direction.

On the other hand, the fundamentals of an actuator having a rotating shaft are also applied to a stepping motor.

FIG. 21 is a partially sectional view showing a two-phase stepping motor disclosed in Japanese Patent Publication No. H06-083561 as an example of a conventional technique. The stepping motor includes a set of permanent magnets 301 and 302 overlapped with each other through a disk magnetic material 303 fixed to a rotating shaft 311. The permanent magnets 301 and 302 are formed such that a plurality of magnetic poles formed by magnetization in the axial direction alternately become different magnetic poles in the peripheral direction. An inner tooth 305 radially protruding outward and an outer tooth 306 radially protruding inward are formed in each of the stators 307 and 308 which are opposed to the permanent magnets 301 and 302, respectively. The stators 307 and 308 are provided with excitation coils 309 and 310 for exciting the stators 307 and 308, respectively and positioned on both sides of the permanent magnets 301 and 302 such that the stators 307 and 308 are shifted from each other by an electrical angle of $(½)\pi$.

Here, a magnetic flux passes through a housing 317 surrounding the excitation coil 309, the outer tooth 306, the permanent magnet 301, the magnetic material 303, the permanent magnet 302, and the inner tooth 305 in order and then returns to the housing 317. The permanent magnet 301 is a magnet. When the inner tooth 305 and the outer tooth 306 which serve as an inlet and outlet of the magnetic flux are intended to oppose to the plane-magnetized magnets, the inner tooth 305 and the outer tooth 306 are actually on substantially the same plane. The magnetic material 303 serves as merely a back metal and is not excited by the excitation coils 309 and 310. Constituent elements required for the motor are (a) the housing 317 (also serving as a yoke), (b) the excitation coil 309, (c) the inner tooth 305 and the outer tooth 306 (magnet pole teeth), (d) the magnet (permanent magnet 301), (e) the magnetic material 303, (f) the magnet (permanent magnet 302), (g) the inner tooth 305 and the outer tooth 306 (magnet pole teeth), (h) the excitation coil 310, and (i) the housing 318 (also serving as a yoke), which are shown in order along the axial direction.

As described above, according to the stepping motor described in Japanese Patent Publication No. H06-083561, a large number of elements are located so as to overlap with the magnets having the surfaces perpendicular to the shaft in the axial direction. Therefore, a length of the stepping motor in the axial direction lengthens, so that it is hard to thin the stepping motor. In addition, the inner tooth and the outer tooth are provided in each of the stators and located such that the inner tooth and the outer tooth are shifted from each other by an electrical angle $\pi$ in the case where a distance between the same magnetic poles in the peripheral direction of the magnets is given as one electrical angle. Therefore, when the number of magnetic poles of the stepping motor is intended to increase, a width of each of magnetic pole teeth and a gap between adjacent magnetic pole teeth become narrower, so that the difficulty in part processing increases and a physical strength reduces. Thus, the development of a stepping motor which can be thinned and is capable of dealing with an increase in pole has been desired.

FIGS. 22 and 23 show a two-phase stepping motor disclosed in Japanese Patent Publication No. H06-083564 as another example of the conventional technique. FIG. 22 is an exploded perspective view showing the two-phase stepping motor and FIG. 23 is a sectional view after assembly. The stepping motor includes a rotating shaft 403, a first permanent magnet 401, and a second permanent magnet 402. The first permanent magnet 401 and the second permanent magnet 402 are fixed to the rotating shaft 403 and magnetized in a thickness direction. In each of the first permanent magnet 401 and the second permanent magnet 402, different magnetic poles are alternately formed in a peripheral direction. A first stator 406 includes: a set of magnetic pole teeth 404 and 405 which are opposed to both sides of the magnetic poles of the first permanent magnet 401; and an excitation coil 410. A second stator 409 includes: a set of magnetic pole teeth 407 and 408 which are opposed to both surfaces of the magnetic poles of the second permanent magnet 402; and an excitation coil 411. The magnetic pole teeth 404 and 405 of the first stator 406 and the magnetic pole teeth 407 and 408 of the second stator 409 are positioned such that the first stator 406 and the second stator 409 are shifted from each other in the peripheral direction by an electrical angle of $(½)\pi$. When they are assumed to be constituent elements of a magnetic circuit, the magnetic circuit becomes a six-layer structure which includes the magnetic pole tooth 404 of the first stator 406, the first permanent magnet 401, the magnetic pole tooth 405, the magnetic pole tooth 408, the second permanent magnet 402, and the magnetic pole tooth 407 of the second stator 409. The number of air gaps between each of the stators and each of the magnets is two per phase, that is, four in total. Note that the stator is a stator.

As described above, the stepping motor described in Japanese Patent Publication No. H06-083564 is composed of a large number of parts provided in a multi-layer form. Therefore, a length of the stepping motor in the axial direction lengthens, so that it is hard to thin the stepping motor and a cost of parts increases. A large number of parts are provided in the multi-layer form and overlapped with one another in the axial direction. In addition, the number of air gaps between the stators and magnets, by which a magnetic characteristic is significantly influenced, is four, so that the parts cannot be easily assembled with high precision. It is necessary to pass the central rotating shaft through a large number of parts in order during assembly, so that an assembly time lengthens and it is likely to increase an assembly cost. The number of parts is large, so that it is likely to reduce assembly precision due to the accumulation of part processing precision. Thus, it is hard to construct a high performance stepping motor.

A stepping motor having a short shaft is disclosed as another conventional technique (Japanese Patent Application Laid-open No. H02-058035). FIG. 24 shows a structural example of the stepping motor provided as a driving source for an exposure quantity adjusting apparatus, which is disclosed in Japanese Patent Application Laid-open No. H02-058035. A surface of a magnet 505 which is perpendicular to an axial direction is divided in a peripheral direction and magnetized. Two coils 506 and 507 are located on both sides of the magnet 505. The magnet 505 and the coils 506 and 507 are sandwiched by two stators 508 and 509 in a shift direction. Therefore, it is possible to suitably incorporate such a thin stepping motor into the exposure quantity adjusting apparatus for a camera.

However, there are the following problems in the structural example. First, the pole teeth per phase of the stators 508 and 509 which are opposed to the magnet 505 correspond to about half of the entire circumference, so that it is possible to use only a magnetic flux equal to or smaller than half of an effective magnetic flux of the magnet. Therefore, it cannot be said that the above-mentioned structure is effective. Second, the coils are close to the stators in only upper and lower ends, so that the amount of leakage magnetic flux from the coils to the circumference is large. Therefore, it cannot be said that the above-mentioned structure is effective. Third, the pole teeth of the stators which are opposed to the magnet correspond to about half of the entire circumference as described above, so that a range in which a driving force is caused in each excited phase also corresponds to about half of the entire circumference. Therefore, when the driving force is converted into torque, an unnecessary force in a transverse direction is likely to cause, with the result that there are concerns with respect to vibration, noise, non-uniform rotation, and a reduction in positional precision in the stepping motor.

As described above, the conventional actuators and stepping motors have the following problems. The number of parts is large, thereby increasing a cost. It is hard to achieve slimming. High efficiency is hardly obtained. It is hard to deal with an increase in number of poles. Parts cannot be easily fit.

SUMMARY OF THE INVENTION

A first object of the present invention is to provide an actuator which maintains high efficiency, can react to an increase in pole, has a high part fit, and can be manufactured at low cost while it is thinned, and a light quantity adjusting apparatus using the actuator as a driving source.

A second object of the present invention is to provide a high performance stepping motor which can react to an increase in pole, has a high part fit, and can be manufactured at low cost while it is thinned.

To achieve the first object, according to first to fourth aspects of the present invention, there is provided an actuator, including: a magnet which is formed in a ring shape, in which at least one surface perpendicular to a central axis thereof is divided in a peripheral direction and alternately plane-magnetized in different poles; a stator including a plurality of magnetic pole teeth opposed to the magnetized surface of the magnet; a rotor which is held to be rotatable about a rotational axis as a center, includes a disk portion whose surface perpendicular to the rotational axis is bonded to the magnet, and made of a soft magnetic material; and a coil which is located on substantially the same surface as that of the magnet, fixed to the stator, and excites the stator and the disk portion.

According to the actuator having the above-mentioned structure, the coil and the magnet are located on substantially the same surface. For example, the stator to which the coil is fixed and the rotor to which the magnet is fixed each are formed in a thin ring shape, so that the entire apparatus can be thinned. Although the actuator in which the magnet is opposed to the stator in the axial direction to form a closed magnetic path is used, the magnet is fixed to the disk portion of the rotor, with the result that the number of types of air gap between the stator and the magnet becomes only one. Therefore, precision between parts forming the air gap is high, so that assembly is easy. The number of necessary parts into which a shaft is inserted is small, so that assembly is easier. Magnetic fluxes generated in the disk portion of the rotor and the stator by energization to the coil effectively act on the magnet located between the disk portion of the rotor and the stator. A rotating output of the rotor to which the magnet is fixed becomes higher.

In the first to fourth aspects of the present invention, the magnet is preferably fixed to a surface of the disk portion of the rotor which is opposed to the stator on an outer peripheral side and the coil is preferably fixed to a surface of the stator which is opposed to the magnet on an inner peripheral side.

According to the actuator having the above-mentioned structure, the magnetic flux generated by the coil passes through the stator adjacent to the coil, the rotor, and the disk portion. Therefore, a magnetic resistance is small and a leakage magnetic flax reduces. The magnet is located on the outer peripheral side of the actuator and the coil is located on the inner peripheral side thereof. Therefore, a diameter of the magnet becomes larger, with the result that output torque increases.

In the first to fourth aspects of the present invention, the actuator preferably further includes a bearing which is fixed to the stator, rotatably supports a shaft portion of the rotor, and made of a soft magnetic material.

According to the actuator having the above-mentioned structure, the bearing is made of the soft magnetic material having a small magnetic resistance. Therefore, a bearing portion can be also included in an effective magnetic circuit, so that magnetic saturation of the magnetic circuit can be prevented.

In the first to fourth aspects of the present invention, the rotor is preferably positioned in an axial direction by making a tip protruding portion of the shaft portion to be in contact with a bottom side of the bearing and the bearing is preferably extended such that a tip end surface thereof is close to the disk portion of the rotor.

According to the actuator having the above-mentioned structure, the rotor is in contact with the tip protruding portion of the shaft portion for rotational sliding, having small friction and a small contact diameter. Therefore, even when attraction in the axial direction is large, the influence of the friction can be reduced. The stator fixed to the bearing is constantly attracted to the rotor in the axial direction through the magnet, with the result that the rotor is resistant to disconnect in an opposite direction to the bearing. Therefore, it is possible to perform positioning in the axial direction and a radial direction using the single bearing. The tip end surface of the bearing is made close to the disk portion of the rotor, so that it can be used as a magnetic path having a small magnetic resistance. Thus, magnetic saturation is unlikely to cause.

In the first to fourth aspects of the present invention, the actuator preferably further includes a dummy yoke which is located outside the magnet, bonded to a cover made of a non-magnetic material, and made of a soft magnetic material.

According to the actuator having the above-mentioned structure, when the actuator has the cover to which the dummy yoke is bonded, torque which acts on the magnet in a case other than the case where the stator is excited, so-called cogging torque can be adjusted according to a characteristic of the actuator. For example, retaining torque of the rotor at each of start and end positions of rotation of the rotor can be increased without a change in a rotational characteristic of the rotor at the time of energization to the coil.

Furthermore, to achieve the first object, according to the first to fourth aspects of the present invention, there is provided a light quantity adjusting apparatus, including: a magnet which is formed in a ring shape, in which at least one surface perpendicular to a central axis thereof is divided in a peripheral direction and alternately plane-magnetized in different poles; a stator including a plurality of magnetic pole teeth opposed to the magnetized surface of the magnet; a rotor which is held to be rotatable about a rotational axis as a center, includes a disk portion whose surface perpendicular to the rotational axis is bonded to the magnet, and made of a soft magnetic material; a coil which is located on substantially the same surface as that of the magnet, fixed to the stator, and excites the stator and the disk portion; an output member which operates in response to rotation of the rotor; a base plate including an opening portion; and a light quantity adjusting member which is driven by the output member and moves above the opening portion of the base plate to change a quantity of light passing through the opening portion.

According to the light quantity adjusting apparatus having the above-mentioned structure, a quantity of light passing through the opening portion can be changed by using the actuator as a driving source. Therefore, the light quantity adjusting apparatus itself can be thinned.

Furthermore, to achieve the second object, according to fifth to eighth aspects of the present invention, there is provided a stepping motor, including: a first magnet and a second magnet, each of which is formed in a ring shape, in each of which at least one surface perpendicular to a central axis thereof is divided in a peripheral direction and alternately plane-magnetized in different poles; a first stator including a plurality of magnetic pole teeth which are opposed to the magnetized surface of the first magnet and extended in a radial direction; a second stator including a plurality of magnetic pole teeth which are opposed to the magnetized surface of the second magnet and extended in the radial direction; a rotor which is made of a soft magnetic material and includes a shaft portion held to be rotatable and a disk portion having a surface perpendicular to the shaft portion; a first coil which is fixed to the first stator and excites the first stator and the disk portion of the rotor to which the first magnet is fixed on one side; and a second coil which is fixed to the second stator and excites the second stator and the disk portion of the rotor to which the second magnet is fixed on the other side.

According to the stepping motor having the above-mentioned structure, a three-layer structure (upper, middle, and lower layers) has the first stator to which the first coil is fixed, the second stator to which the second coil is fixed, and the rotor to which the first magnet and the second magnet are fixed and which is interposed between the first stator and the second stator, so that the stepping motor can be thinned. Although a two-phase stepping motor is used, the number of types of air gap between the stator and the magnet is only two. Therefore, high precision assembly is easy. The number of necessary parts into which a shaft is inserted is small, so that assembly is easier. Magnetic fluxes generated by energization to the first coil effectively act on the first magnet located between the first stator and the disk portion of the rotor to which the first magnet is fixed in the axial direction. Magnetic fluxes generated by energization to the second coil effectively act on the second magnet located between the second stator and the disk portion of the rotor to which the second magnet is fixed in the axial direction. Thus, a rotating output of the rotor to which the first magnet and the second magnet are fixed becomes higher.

In the fifth to eighth aspects of the present invention, it is preferable that a first flange portion which protrudes from the disk portion to the first stator be located inside the first coil fixed to the first stator, the first magnet be located outside the first coil, and the disk portion of the rotor be located on an opposite side of the first coil which is in contact with the first stator, a second flange portion which protrudes from the disk portion to the second stator be located inside the second coil fixed to the second stator, the second magnet be located outside the second coil, and the disk portion of the rotor be located on an opposite side of the second coil which is in contact with the second stator.

According to the stepping motor having the above-mentioned structure, the magnetic fluxes generated by the first coil and the second coil pass through the first and second stators which are adjacent to those coils and each made of the soft magnetic material, the first and second flange portions, and the disk portion of the rotor. Therefore, a magnetic resistance is small and a leakage magnetic flux reduces. The first magnet and the second magnet are located on an outer peripheral side of the stepping motor, and the first coil and the second coil are located on an inner peripheral side thereof. Therefore, a diameter of each of the magnets becomes larger, with the result that output torque increases.

In the fifth to eighth aspects of the present invention, the stepping motor preferably further includes a bearing which is fixed to the first stator and the second stator, rotatably supports the rotor, and made of a soft magnetic material, the bearing being connected with the first flange portion and the second flange portion.

According to the stepping motor having the above-mentioned structure, the bearing is made of the soft magnetic material having a small magnetic resistance. Therefore, a bearing portion can be also included in an effective magnetic circuit, so that magnetic saturation of the magnetic circuit can be prevented.

The above and other objects, features, and advantages of the invention will become more apparent from the following detailed description taken in conjunction with the accompanying drawings.

DETAILED DESCRIPTION OF THE PREFERRED EMBODIMENTS

Hereinafter, the present invention will be described in detail with reference to the accompanying drawings.

Actuators and light quantity adjusting apparatuses according to the present invention are described below in a first embodiment to a fourth embodiment. Stepping motors according to the present invention are described below in a fifth embodiment to an eighth embodiment.

(First Embodiment)

Figure 1:
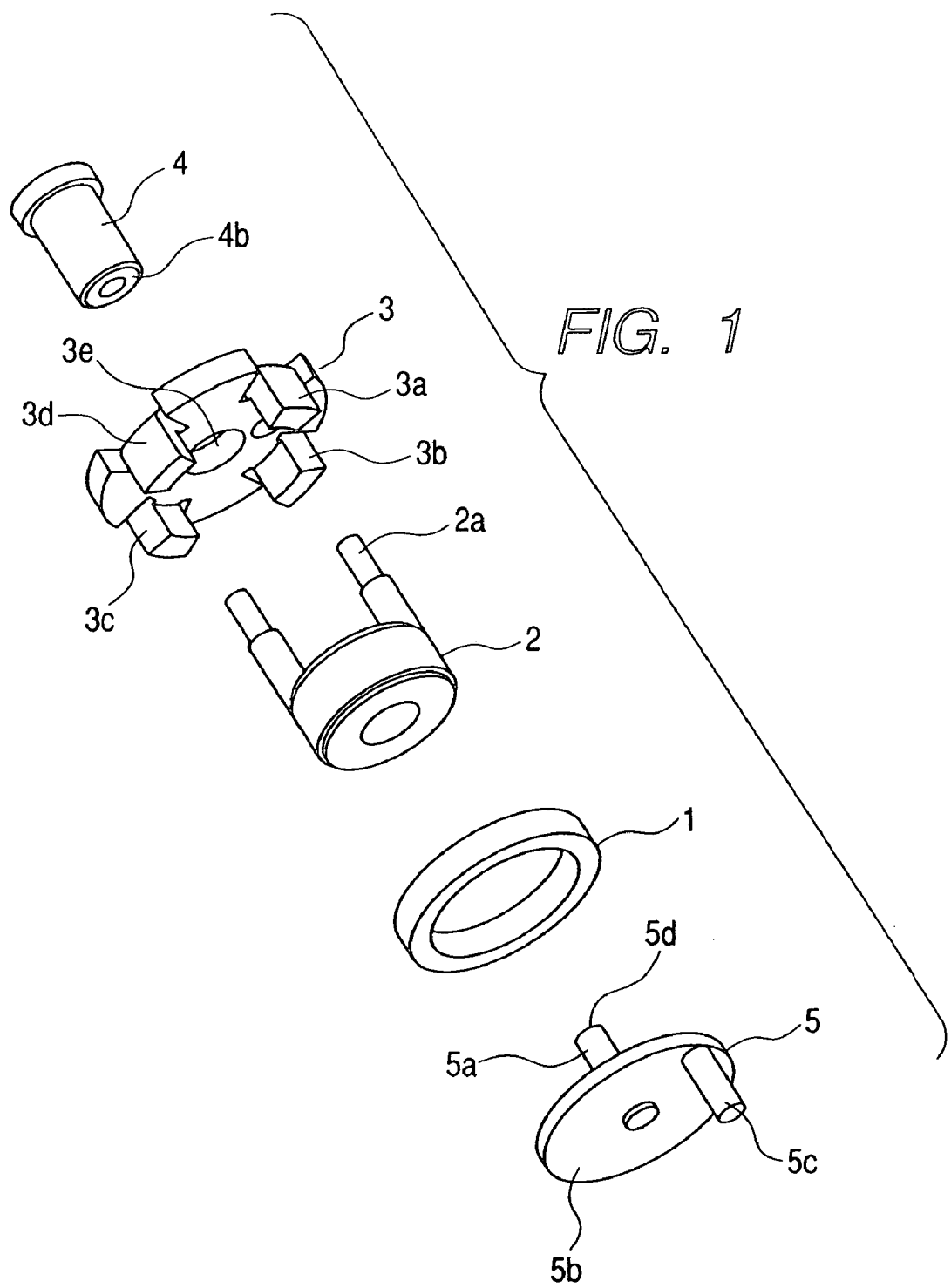
FIG. 1 is an exploded perspective view showing an actuator according to a first embodiment of the present invention.
Figure 2:
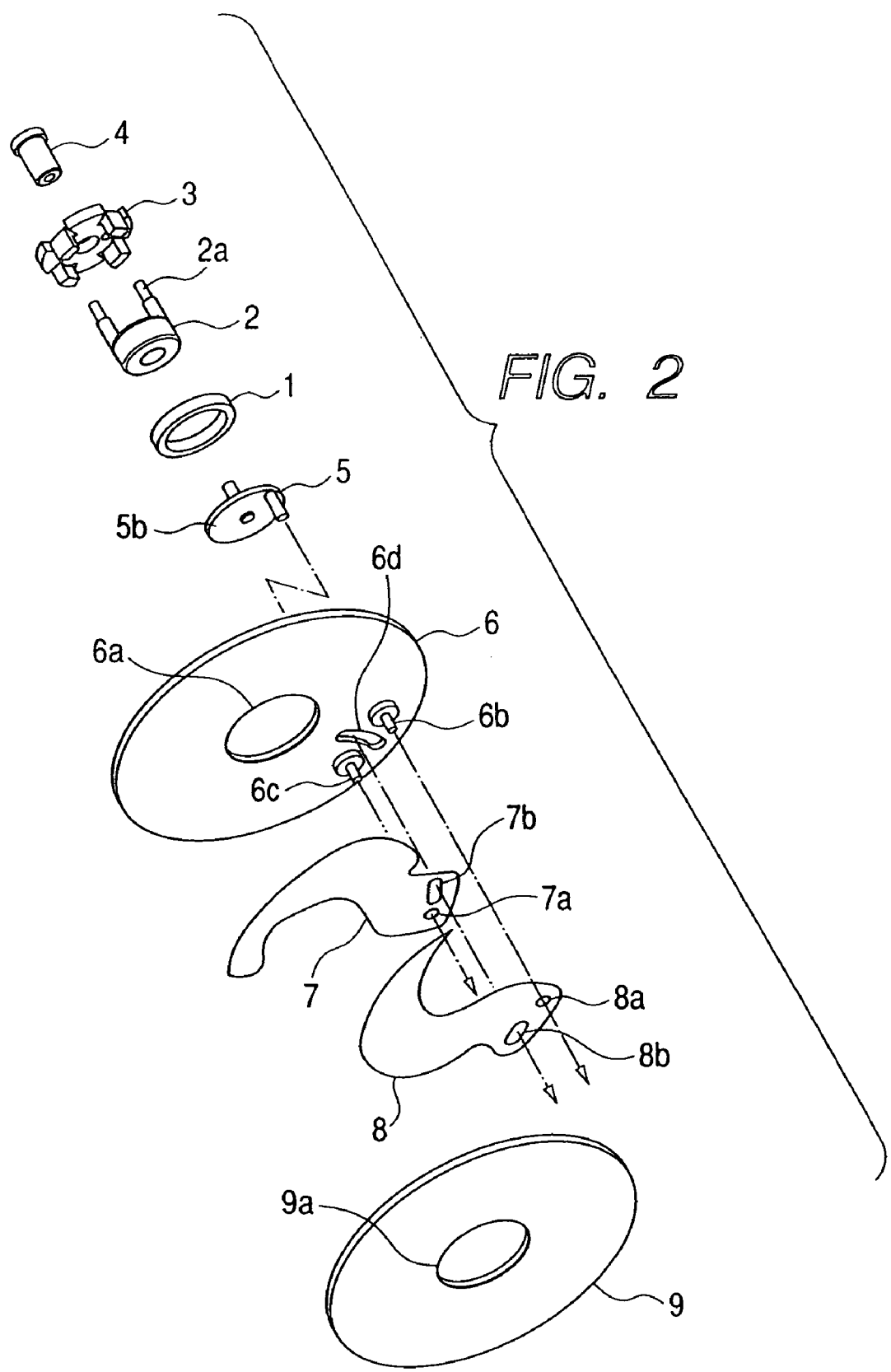
FIG. 2 is an exploded perspective view showing a light quantity adjusting apparatus using the actuator according to the first embodiment of the present invention.
Figure 3:
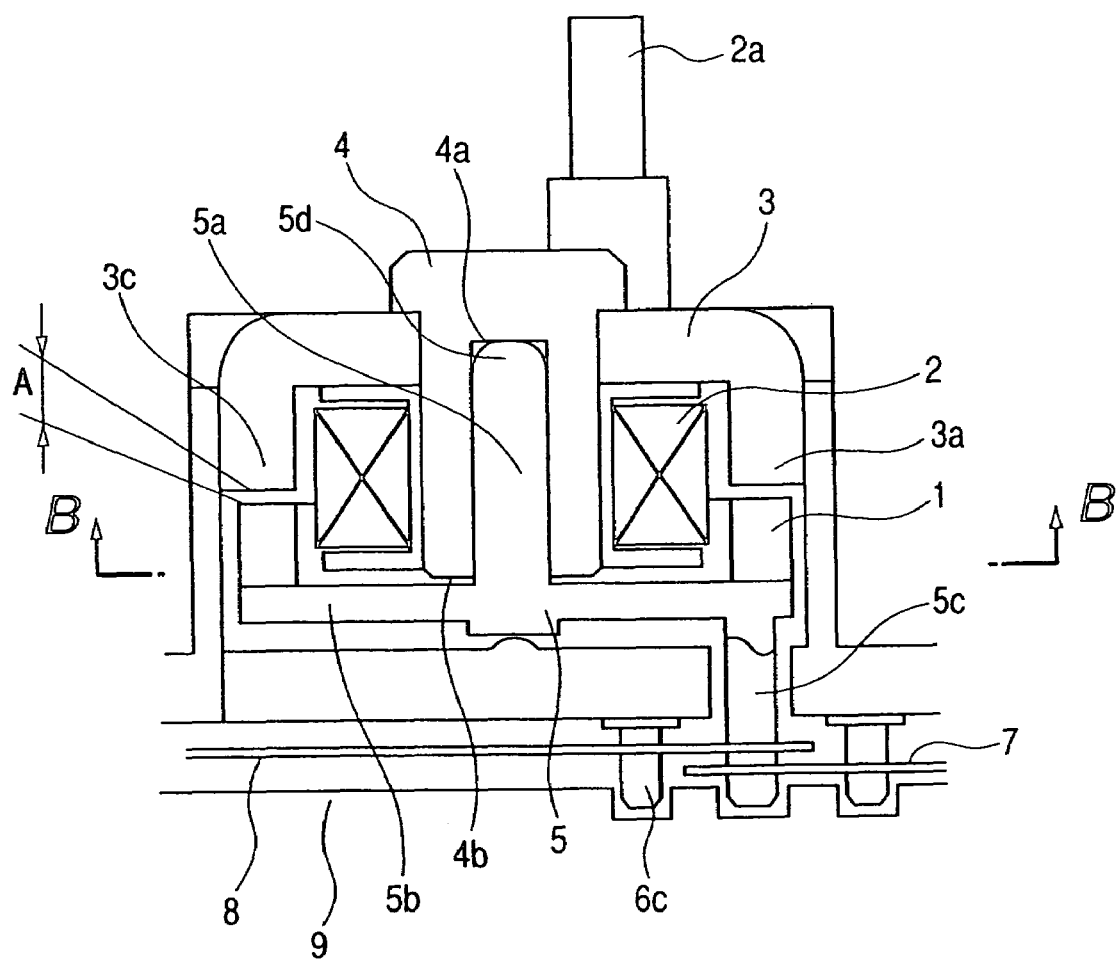
FIG. 3 is a sectional view in an axial direction, showing the light quantity adjusting apparatus shown in FIG. 2.

FIGS. 1 to 4 show an actuator and a light quantity adjusting apparatus according to a first embodiment of the present invention. More specifically, FIG. 1 is an exploded perspective view showing the actuator. FIG. 2 is an exploded perspective view showing a light quantity adjusting apparatus in which the actuator shown in FIG. 1 is incorporated as a driving source. FIG. 3 is a sectional view in an axial direction, showing the light quantity adjusting apparatus. FIGS. 4A and 4B are bottom views of B—B in FIG. 3, showing a state of rotation operation of a magnet. FIG. 4A shows a magnet and a stator in a state in which the magnet is rotated counterclockwise when viewed from a base plate side. FIG. 4B shows the magnet and the stator in a state in which the magnet is rotated clockwise by 30 degrees from the state shown in FIG. 4A by switching energization to the coil.

Figure 4A:
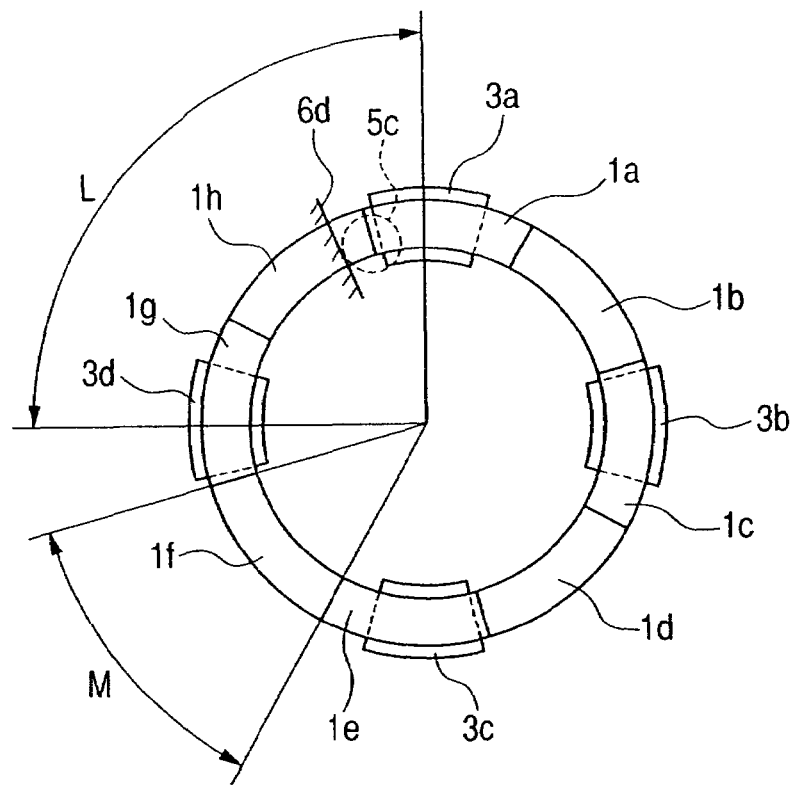
FIGS. 4A and 4B are bottom views showing the actuator in respective states in which a magnet is rotated counterclockwise and clockwise by switching energization to a coil.
Figure 4B:
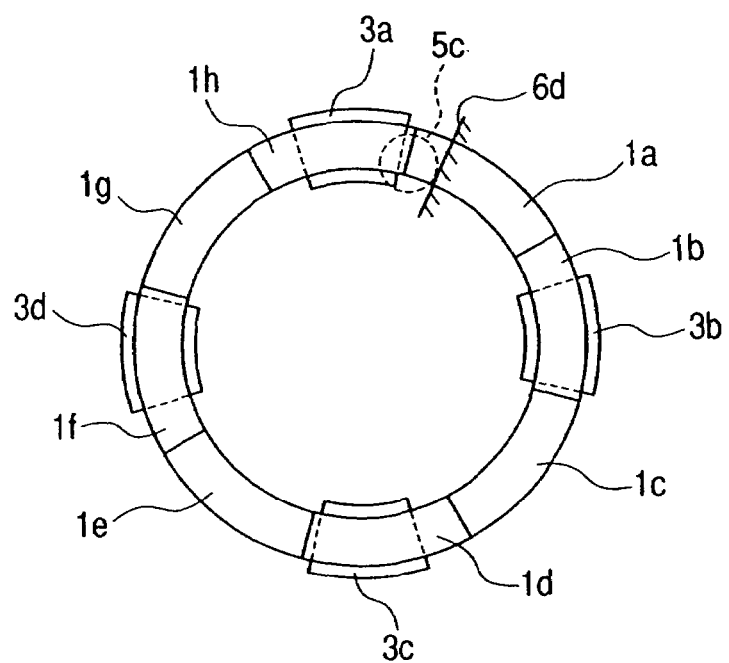

In FIGS. 1 to 4A and 4B, a ring magnet 1 has magnetized portions which are formed by dividing a surface of the magnet 1 which is perpendicular to the central axis (virtual axis) thereof into P (P is an even number; P=8 in this embodiment) in a peripheral direction. The magnetized portions are alternately plane-magnetized in the N-pole and the S-pole. Here, the surface of the magnet 1 which is opposed to a stator 3 (described later), that is, an opposite rear surface to a surface of the magnet 1 which can be viewed in FIG. 1, is magnetized. As shown in FIGS. 4A and 4B, the magnetized portions 1a, 1c, 1e, and 1g are magnetized in the S-pole and the magnetized portions 1b, 1d, 1f, and 1h are magnetized in the N-pole. The magnet 1 is formed by compressing a bonded neodymium magnet. The magnet 1 may be formed by injection molding or made of a ferrite system material. A coil 2 is formed by winding a lead wire about a bobbin made of an insulating material and fixed to the stator 3 (described later) at a substantially concentric position to the magnet 1 on an inner peripheral surface side of the magnet 1. The coil 2 is connected with an outside through terminal portions 2a.

The stator 3 is made of a soft magnetic material and produced by a forging press process or the like. The stator 3 includes: magnetic pole teeth 3a, 3b, 3c, and 3d which protrude in a comb-tooth shape from a surface perpendicular to the central axis thereof in an axial direction; and a hole 3e to which a bearing 4 (described later) is fixed. The number of magnetic pole teeth is ½ of the number of poles (P) of the magnetized magnet 1, that is, 4. All the magnetic pole teeth 3a to 3d of the stator 3 are excited in the same pole (N-pole or S-pole) by energization to the coil 2.

The bearing 4 is fixed into the hole 3e of the stator 3 to smoothly rotate a rotor 5 (described later). The bearing 4 is made of metal which is a soft magnetic material such as electromagnetic soft iron by, for example, a sintering manufacturing method. This material is desirably an oilless type. A bottom portion 4a is a thrust abutment having a high sliding property. The bottom portion 4a is in contact with a hemispherical portion 5d of the rotor 5 (described later) to position the magnet 1 relative to the stator 3 in an axial direction, so that the bottom portion 4a becomes the center of rotation. A flat portion 4b is opposed to a disk portion 5b of the rotor 5 (described later) and is close to the disk portion 5b so as not to be in contact with the disk portion 5b.

The rotor 5 is composed of a shaft portion 5a rotatably supported by the bearing 4, the disk portion 5b having a surface orthogonal to the shaft portion 5a, an output pin 5c, and the hemispherical portion 5d formed at the tip of the shaft portion 5a. The rotor 5 is made of a soft magnetic material such as electromagnetic soft iron, having a small magnetic resistance. An opposite side surface to the magnetized surface of the magnet 1 is fixed to the disk portion 5b of the rotor 5. The output pin 5c is used to transfer the rotation of the rotor 5 to blades (described later) and protrudes from a cutaway portion 6d of a base plate 6 (described later). The surface of the hemispherical portion 5d is smoothly processed so as to minimize friction caused between the rotor 5 fixed to the magnet 1 and the bottom portion 4a of the bearing 4 fixed to the stator 3 by axial directional attraction caused between the magnet 1 and the magnetic pole teeth of the stator 3.

The base plate 6 for an actuator has an opening portion 6a. Blades 7 and 8 (described later) are pivoted above a flat surface of the base plate 6. Support shafts 6b and 6c are used as the centers of pivot of the blades 7 and 8 (described later). The cutaway portion 6d limits a rotational range of the output pin 5c of the rotor 5 to determine an open position and closed position of the blades 7 and 8 by the ends of the cutaway portion 6*d*. The base plate 6 is a molded part made of, for example, engineering plastics.

The blades 7 and 8 are light quantity adjusting members which are operatively linked with the output pin 5*c* of the rotor 5 and pivoted (inserted into and removed from an optical path) above the opening portion 6*a* of the base plate 6 to adjust a quantity of light passing through the opening portion 6*a*. The support shafts 6*b* and 6*c* of the base plate 6 are inserted into holes 7*a* and 8*a* of the blades 7 and 8 as the centers of pivot. The output pin 5*c* is inserted into long holes 7*b* and 8*b* to perform open and close operations on the opening portion 6*a*. A retaining plate 9 has an opening portion 9*a*.

Next, an actuator in the above-mentioned structure will be described. As shown in the sectional view of FIG. 3 (hatching indicating the sectional view is omitted), two upper and lower units are provided. The upper unit is the stator 3 to which the bearing 4 and the coil 2 are fixed. The lower unit is the rotor 5 whose disk portion 5*b* is bonded to the magnet 1. When an air gap between the magnetized surface of the magnet 1 and each of the magnetic pole teeth of the stator 3 is given by a gap A, the gap A may be set to a minimal distance at which the magnet 1 is not in contact with the respective magnetic pole teeth even when the rotor 5 rotates. On the other hand, the magnet 1 is opposed to the respective magnetic pole teeth of the stator 3 in the axial direction, so that the entire rotor 5 is constantly attracted to the stator 3 side. Therefore, the hemispherical portion 5*d* of the rotor 5 is constantly in contact with the bottom portion 4*a* of the bearing 4 fixed to the stator 3 in a small rotational friction state, with the result that the gap A is constantly maintained to a predetermined distance with high precision.

In FIG. 4A, reference L denotes an angular pitch between adjacent magnetic pole teeth of the stator 3 and M denotes a central angle corresponding to a width of each of the magnetized portions of the magnet 1. Reference L is expressed by (360 degrees×2/P). Here, L is 90 degrees. Reference M is expressed by (360 degrees/P). Here, M is 45 degrees. In FIG. 4A, the rotor 5 rotates counterclockwise. The output pin 5*c* is in contact with one inner end of the cutaway portion 6*d* of the base plate 6 and then stops. In contrast to FIG. 4A, in FIG. 4B, the rotor 5 rotates clockwise. The output pin 5*c* is in contact with the other opposite inner end of the cutaway portion 6*d* of the base plate 6 and then stops.

A magnetic circuit of the actuator according to the first embodiment of the present invention will be described with reference to FIG. 3.

When the coil 2 located in the inner circumference is energized, magnetic fluxes are generated around the coil 2. The magnetic fluxes reach the comb-tooth-shaped magnetic pole teeth 3*a*, 3*b*, 3*c*, and 3*d* of the stator 3 which are located near the coil 2 and opposed to the magnetized surface of the magnet 1. The magnetic fluxes flow from the magnetic pole teeth 3*a*, 3*b*, 3*c*, and 3*d* to the disk portion 5*b* of the rotor 5 through the magnet 1. After that, the magnetic fluxes flow into the center of the disk portion 5*b* of the rotor 5 and transmit through a sectional area into which the flat portion 4*b* of the bearing 4 which is opposed to the disk portion 5*b* and a cross-section of the shaft portion 5*a* of the rotor 5 are combined. Then, the magnetic fluxes flow from the bearing 4 to the stator 3. As a result, the circulation of the magnetic fluxes is completed. Note that, when a sectional area perpendicular to the direction in which the magnetic fluxes flow is small, magnetic saturation is likely to be caused in the sectional area. When only the shaft portion 5*a* of the rotor 5 is used, the sectional area is small. Therefore, in order to prevent the magnetic saturation, the magnetic fluxes are allowed to transmit through the sectional area into which the flat portion 4*b* of the bearing 4 and the cross-section of the shaft portion 5*a* of the rotor 5 are combined. In other words, a combination of a shaft diameter of the rotor 5 and a diameter of the bearing 4 is set as a diameter of a magnetic path. The magnetic fluxes are allowed to directly flow from the disk portion 5*b* close to a diameter part of the flat portion 4*b* which is the tip end surface of the bearing 4 to the diameter part. Therefore, the diameter part is used for the magnetic path having a low magnetic resistance to suppress the occurrence of the magnetic saturation. The stator 3, the disk portion 5*b* of the rotor 5, and the bearing 4 each are made of a soft magnetic material such as SUY (electromagnetic soft iron), having a small magnetic resistance, so that a magnetic loss is small.

Here, the reason why the actuator according to the first embodiment has a structure in which space can be saved and high torque can be obtained will be described. In general, when the torque of the actuator is intended to increase without a change in supplied energy amount, it is necessary to make a choice of a magnet having a high magnetic force and to locate the magnet in a space into which a magnetic flux flows, that is, in a magnetic field that an magnetic path is open. On the other hand, an opened part of a magnetic circuit has a larger magnetic resistance as it widens (lengthens). Therefore, it is advantageous to minimize the part. The magnet 1 in the first embodiment of the present invention is plane-magnetized (alternately magnetized on the surface side perpendicular to the shaft in the peripheral direction). Therefore, a thickness of a magnet having a threshold thickness or more is not proportional to a magnetic force. That is, a magnet has a sufficient magnetic force even when it is thin, so that the magnet can be thinned to the extent a sufficient physical strength is satisfied in, for example, manufacturing or assembling. Thus, in the first embodiment of the present invention, the gap A between the magnet 1 and the stator 3 may be set to a minimal distance required for the rotor and the stator based on assembly and processing precision. The magnet 1 is in directly contact with the disk portion 5*b*, so that there is no gap.

According to the actuator in the first embodiment of the present invention, a space which is other than the plate thickness of the stator 3, the thickness of the disk portion 5*b* of the rotor 5, and a minimal gap required for rotation can be used for the coil 2. As described above, it is unnecessary to significantly increase the thickness of the magnet 1 in many cases, so that the magnet 1 having a necessary thickness is used. The magnetic pole teeth 3*a*, 3*b*, 3*c*, and 3*d* of the stator 3 are protruded to the magnet 1 side. An air gap between each of the magnetic pole teeth 3*a*, 3*b*, 3*c*, and 3*d* and the disk portion 5*b* of the rotor 5 is sufficiently narrowed. As a result, a magnetic resistance is small. Even when a current flowing into the coil 2 reduces, a large number of magnetic fluxes can be generated. In addition, it is possible to obtain a thin actuator having high output and high efficiency because strong repulsion and attraction from the magnet 1 can be used. Therefore, according to the actuator in the first embodiment of the present invention, a loss of the magnetic circuit which is composed of the coil 2, the stator 3, the disk portion 5*b*, and the bearing 4 for the stator 3 is small. There is no dead space. Maximal turns of wire for the coil 2 can be wound, that is, the number of turns can be increased. Thus, torque per space is large, so that a motor having high efficiency is obtained.

Next, a relationship between the magnet 1 subjected to rotational operation and the stator 3 will be described with reference to FIGS. 4A and 4B. The magnetized surface of the magnet 1 is opposed to the magnetic pole teeth 3a, 3b, 3c, and 3d on an opposite side of a paper surface. Therefore, "1a (rear surface S-pole)" and the like are shown in FIGS. 4A and 4B. For the sake of easy understanding, the coil 2 and the like are not shown.

When the coil 2 is not energized, the magnet 1 first stops at a counterclockwise rotating position as shown in FIG. 4A. In this state, a position of the output pin 5c is the counterclockwise rotating position. The blade 7 pivots counterclockwise about the support shaft 6c as the center of pivot and the blade 8 pivots clockwise about the support shaft 6b as the center of pivot. That is, the opening portion 6b of the base plate 6 is blocked, so that a shutter becomes a closed state. For example, when the coil 2 is positively energized in the closed state to excite the magnetic pole teeth 3a, 3b, 3c, and 3d of the stator 3 in the S-pole, the magnet 1 receives an electromagnetic force in the rotational direction and starts to smoothly rotate clockwise. When the magnet 1 rotates by a predetermined angle, the rotation is stopped by the cutaway portion 6d of the base plate 6 and the energization to the coil 2 is shut off at a predetermined timing. This state is shown in FIG. 4B. The blade 7 pivots clockwise about the support shaft 6c as the center of pivot and the blade 8 pivots counterclockwise about the support shaft 6b as the center of pivot. Then, the blades 7 and 8 are removed from the opening portion 6a of the base plate 6, so that the shutter becomes a full open state.

Next, when the coil 2 is reversely energized in the state shown in FIG. 4B to excite the magnetic pole teeth 3a, 3b, 3c, and 3d of the stator 3 in the N-pole, the magnet 1 receives an electromagnetic force in the rotational direction by the excitation of the magnetic pole teeth 3a, 3b, 3c, and 3d and starts to smoothly rotate counterclockwise. When the magnet 1 rotates by a predetermined angle, the rotation is stopped by the cutaway portion 6d of the base plate 6 and the energization to the coil 2 is shut off at a predetermined timing. This state is shown in FIG. 4A. The blade 7 pivots counterclockwise about the support shaft 6c as the center of pivot and the blade 8 pivots clockwise about the support shaft 6b as the center of pivot. Then, the shutter becomes a closed state in which the opening portion 6a of the base plate 6 is completely blocked.

Therefore, when the energization directions to the coil 2 are switched, the light quantity adjusting apparatus serves as a shutter mechanism for blocking and unblocking light passing through the opening portion.

As described above, according to the structure of the first embodiment of the present invention, an actuator which is thin in the axial direction without a reduction in efficiency is obtained. Magnetic constituent elements are (a) the stator 3 (magnetic pole teeth 3a, 3b, 3c, and 3d), (b) the magnet 1 and the inner peripheral coil 2, and (c) the disk portion 5b of the rotor 5, which are shown in order along the axial direction. Thus, the actuator can be thinned.

The axial directional attraction constantly acts, so that the rotor 5 is resistant to disconnect in an opposite direction to the bearing 4. Therefore, it is possible to obtain a structure in which positioning in the axial direction and a radial direction is performed by using the single bearing 4 and the disconnection to the opposite side in the axial direction is easily prevented.

Here, the reasons why such an actuator which fundamentally includes the magnet, the coil, and the stator has a structure in which high torque can be obtained and parts can be produced at low cost and thinned because the number of parts is small will be described.

Firstly, the ring magnet 1 is fixed to the surface of the disk portion 5b of the rotor 5 made of the soft magnetic material. The stator 3 excited by the coil 2 is opposed to the magnetized surface of the magnet 1. As a result, the air gap between the stator 3 and the magnet 1 is set to only a gap.

Secondly, the surface of the magnet 1 which is perpendicular to the virtual central axis thereof is divided to be alternately magnetized (plane-magnetized) in different poles.

Thirdly, a shape in which a gap between the rotor 3 and the disk portion 5b of the rotor 5 is minimized while the coil 2 is enclosed in the comb-tooth shape in which the magnetic pole teeth 3a, 3b, 3c, and 3d of the stator 3 are extended in the axial direction. Such a shape is provided in the entire circumference.

Fourthly, the magnet 1 is located on the external side (outer peripheral side) and the coil 2 is located inside the inner peripheral surface on substantially the same axis at substantially the same height.

Fifthly, the number of magnetic pole teeth 3a, 3b, 3c, and 3d provided in the stator 3 is ½ of the number of magnetized magnetic poles on the magnet 1.

Sixthly, the single bearing 4 for the rotor 5 is provided on the stator 3 side which causes attraction.

According to the above-mentioned structure, the magnetic flux generated by the energization to the coil 2 crosses the magnet 1 located between the stator 3 and the disk portion 5b of the rotor 5, so that an electromagnetic force is effectively caused. The magnet 1 is integrally formed with the disk portion 5b of the rotor 5. The coil 2 is fixed to the stator 3. As a result, the air gap between the stator 3 and the magnet 1 is set to only a gap. Therefore, the number of parts is small. The entire actuator is composed of the three portions, so that it is easily assembled and an assembly cost can be reduced. For example, a bonded magnet used as a material of the magnet 1 is generally likely to break. When the bonded magnet is bonded to the rotor 5 made of electromagnetic soft iron or the like, a mechanical strength can be increased. The disk portion 5b of the rotor 5 also serves as a back metal, so that the actuator can be maintained to a magnetically stable state, a magnetic strength thereof is increased, and a reduction in magnetic force due to a change in temperature is suppressed.

The surface of the magnet 1 which is perpendicular to the axial direction is magnetized, so that the actuator can be thinned as compared with an actuator using a cylindrical magnet whose outer peripheral surface is magnetized. The stator 3 is extended in the axial direction. Therefore, even when a height of turns of wire for the coil 2 is increased, a distance between the magnet 1 and the stator 3 can be shortened, so that a magnetic resistance is small. The actuator has not a structure in which a set of inner and outer teeth is opposed to a magnet for the transmission of a magnetic flux but a structure in which the magnetic flux is allowed to flow from each magnetic pole tooth into the magnet. As a result, the number of magnetic pole teeth per phase may be ½ of the number of magnetic poles of the magnetized magnet. Thus, as compared with a conventional actuator in which the number of magnetic pole teeth per phase is equal to the number of magnetic poles of the magnetized magnet, it is advantageous in workability and mechanical strength with respect to a width of each of the magnetic pole teeth and an interval therebetween particularly in the case where the number of magnetic poles of the actuator is intended to increase.

The magnet 1 is located on an outermost side (outer peripheral side) in the inner portion of the motor serving as an actuator, so that a radius of the magnet 1 becomes larger, which is advantageous to convert a generated force into large torque. In the same view, even when the magnet exists in a location having a small radius, a total percentage of the magnet that contributes to increased torque is small. Thus, a width of the magnet 1 on a surface thereof which is perpendicular to the axial direction is narrowed and a volume of the coil 2 located inside the magnet 1 is increased according to the narrowed width, with the result that space balance efficiency is high and a characteristic of the actuator can be improved. The coil 2 is located at the same height as that of the magnet 1, so that the actuator can be thinned without an increase in height in the axial direction.

In addition, the stator 3 has the magnetic pole teeth 3a to 3d formed along the entire circumference at regular pitches. Thus, an area of the stator opposed to the magnet 1 can be increased, with the result that it is possible to maximally use the magnetic fluxes from the magnet 1. The bearing 4 is made of the soft magnetic material, so that the magnetic fluxes passing through the bearing are unlikely to saturate. Thus, there is no reduction in efficiency.

The coil 2 is surrounded by the stator 3 made of the soft magnetic material and the like, so that the amount of leakage magnetic flux from the magnetic circuit is small. Therefore, there is no reduction in efficiency. The driving force is caused in a range corresponding to the entire circumference, so that an unnecessary force in a transverse direction is unlikely to cause when the driving force is converted into torque. Thus, vibration, noise, and non-uniform rotation in the actuator are unlikely to be caused, thereby obtaining an actuator having high stop position precision.

According to the first embodiment of the present invention, the rotor 5 and the bearing 4 are provided in addition to minimal elements for the electromagnetic driving apparatus, such as the magnet 1, the stator 3, and the coil 2, so that the number of parts is small. Each element has a flat shape which is simple and easy to produce, so that a manufacturing cost becomes lower.

The axial directional attraction constantly acts between the rotor 5 and the stator 4, so that the rotor 5 is resistant to disconnect in the opposite direction to the bearing 4. Therefore, it is possible to obtain a structure in which positioning of the rotor 5 in the axial direction and radial direction thereof is performed by using the single bearing 4 provided on the stator 3 side and a simple stopper member for the rotor 5 is provided in a cover or the like on the opposite side in the axial direction. When an output portion such as the output pin 5c is devised such that reaction from a member to be driven is set to a value equal to or smaller than the attraction of the rotor 5, the stopper member provided in the cover or the like can be omitted. Thus, it is possible to further thin the actuator.

(Second Embodiment)

Figure 5:
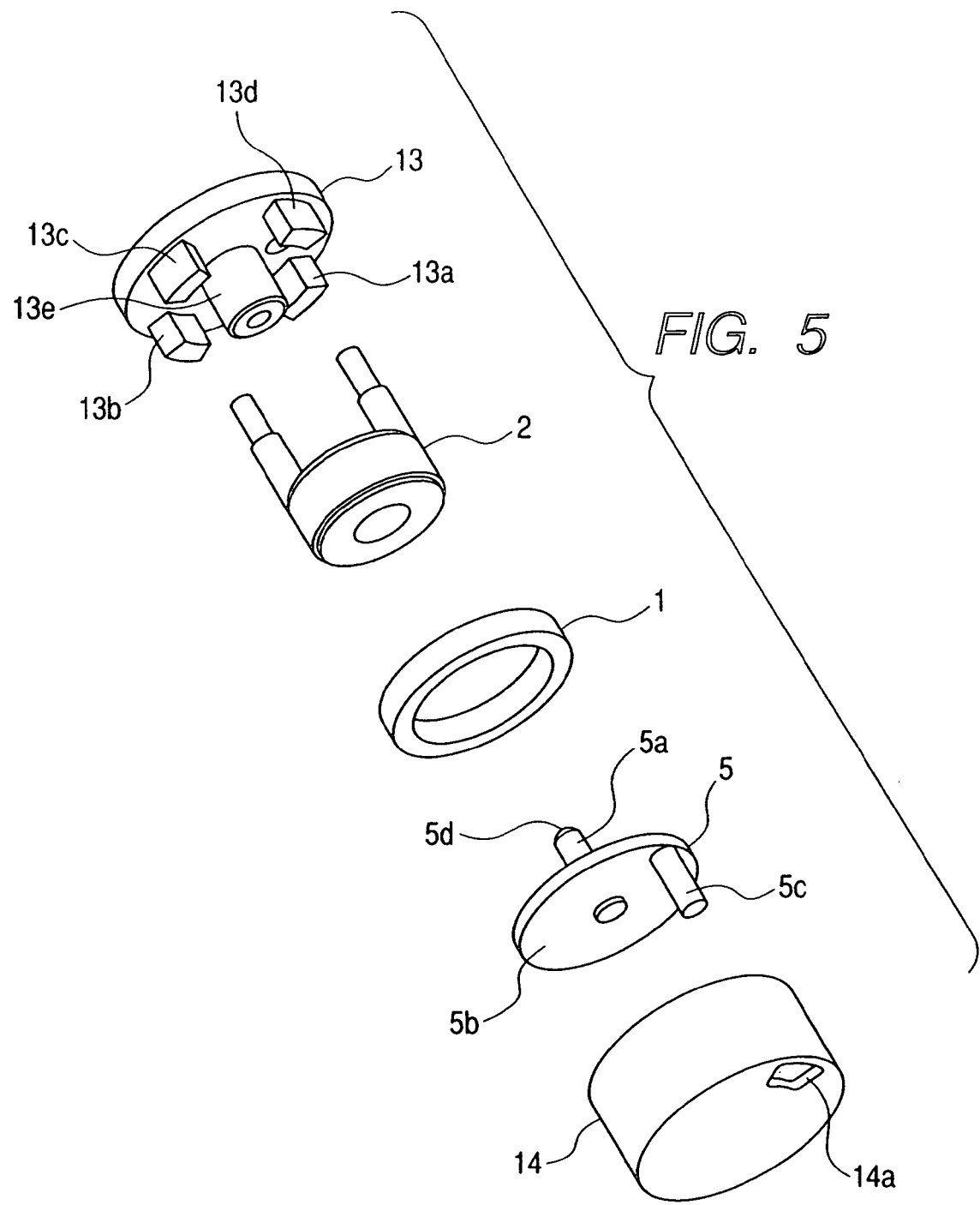
FIG. 5 is an exploded perspective view showing an actuator according to a second embodiment of the present invention.

FIG. 5 is a perspective view showing an actuator according to a second embodiment of the present invention. Only a point different from the first embodiment will be described.

In the first embodiment, each of the stator 3 and the bearing 4 is made of the soft magnetic material. In the second embodiment of the present invention, the stator 3 and the bearing 4 are integrally formed, so that a stator 13 having a bearing portion 13e is obtained. Such a structure can be realized by, for example, forging, drawing, or a metal injection mold manufacturing method.

In FIG. 5, the stator 13 includes not only magnetic pole teeth 13a, 13b, 13c, and 13d but also the bearing portion 13e and acts to smoothly rotate the stator 5. Therefore, a process for assembling the bearing and the stator in the first embodiment is unnecessary, so that a cost can be further reduced. When the two parts are separated from each other, four parts, that is, the magnet, the rotor, the bearing, and the stator are involved in the precision of a distance between the magnet and each of the magnetic pole teeth of the stator, by which a characteristic of the actuator is determined. In contrast to this, in the second embodiment, the bearing (portion) and the stator are integrally formed. As a result, the actuator is composed of the magnet, the rotor, and the stator with the bearing and the number of parts reduces. An assembly error between the bearing and the stator and a variation in assembly are removed. Thus, a distance between the magnet 1 and each of the magnetic pole teeth 13a, 13b, 13c, and 13d of the stator 13 is determined with higher precision, with the result that the distance can be used as a shorter distance at which higher torque can be produced.

When the base plate is not a dedicated plate, a cover 14 may be used. The cover 14 has a cutaway portion 14a for regulating the rotational angle of the rotor 5 and is made of a non-magnetic material such as plastic. The cover 14 is located on the same axis as that of the stator 13. Therefore, it is possible to prevent the rotor 5 from dropping off and foreign matter from entering the actuator. For example, when a fitting hole for a screw is provided in the cover 14, the actuator can be used as a general purpose product. Other portions are identical to those in the first embodiment and thus the description is omitted here.

(Third Embodiment)

Figure 6:
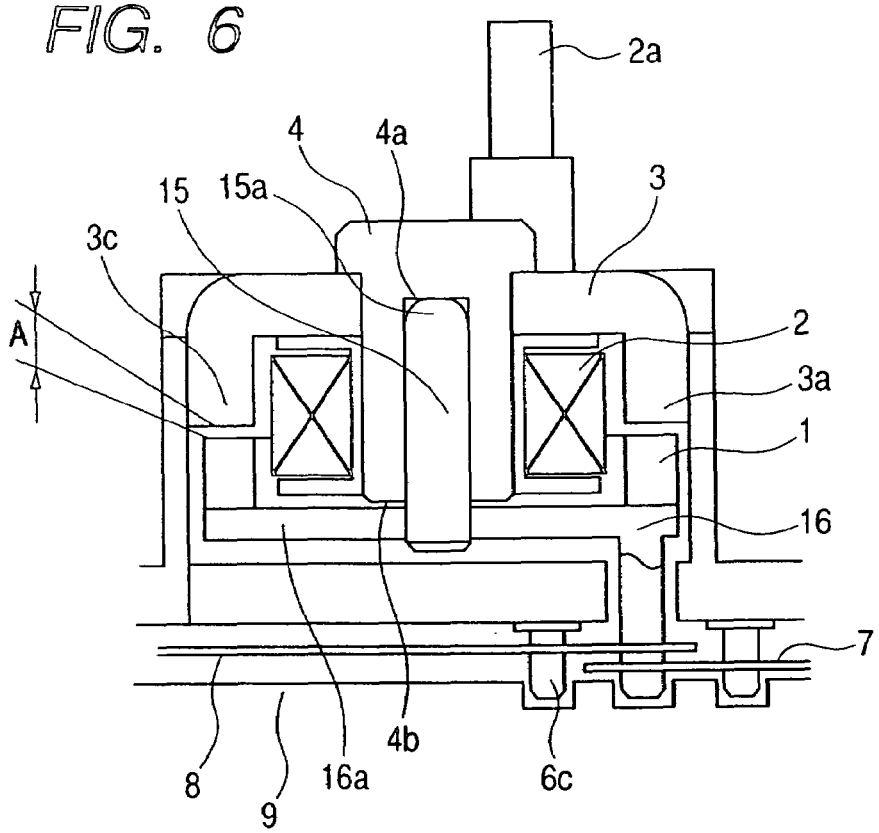
FIG. 6 is a sectional view in an axial direction, showing an actuator according to a third embodiment of the present invention.

FIG. 6 is a sectional view in an axial direction, showing an actuator according to a third embodiment of the present invention, in which a stainless steel rod different from that in the first embodiment and the second embodiment is used as a shaft of a rotor.

In the case where a large number of magnetic fluxes are not generated from a characteristic of a light quantity adjusting apparatus and magnetic saturation is unlikely to cause when magnetic fluxes flow from a disk portion 16a of a rotor 16 to the stator 3, for example, a stainless steel rod is used as a shaft 15 of the rotor 16. A soft magnetic material is used for the disk portion 16a and the like and the stainless steel shaft is produced by press fitting or the like. Other portions are identical to those in the first embodiment and thus the description is omitted here.

Magnetic fluxes around the coil 2 flow through the stator 3 near the coil 2, the magnet 1, the disk portion 16b of the rotor 16, the flat portion 4b of the bearing 4, the bearing 4, and the stator 3 in order. Therefore, the disk portion 16b of the rotor 16 can be produced at low cost by performing press-processing or the like on a soft magnetic material. A simple and low cost rod material can be used for the shaft 15 which serves as the rotational center of the rotor 16 and does not compose a magnetic circuit, so that a cost of the entire apparatus reduces.

(Fourth Embodiment)

Figure 7:
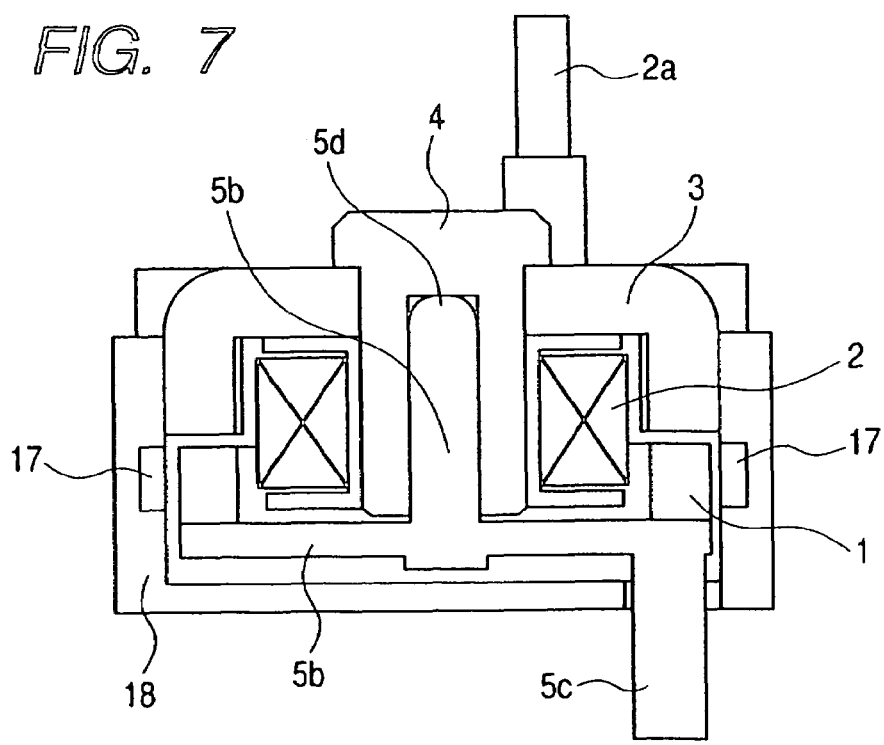
FIG. 7 is a sectional view in an axial direction, showing an actuator according to a fourth embodiment of the present invention.
Figure 8:
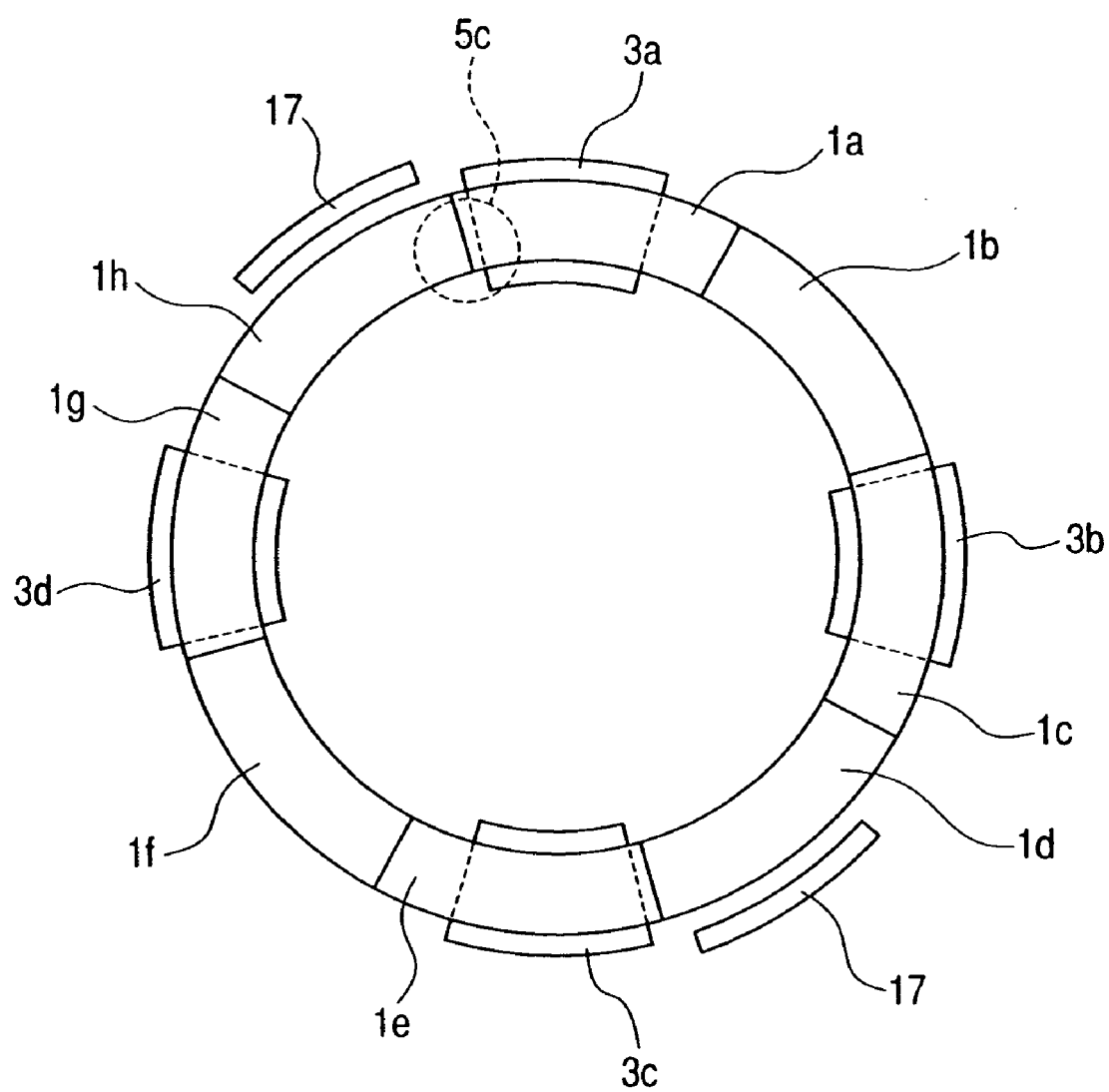
FIG. 8 is a bottom view showing the actuator according to the fourth embodiment of the present invention.

FIGS. 7 and 8 are a sectional view showing an actuator according to a fourth embodiment of the present invention and a top view showing a magnet, a stator, and dummy yokes. As compared with the first embodiment and the second embodiment, a cogging characteristic of the actuator is improved by incorporating dummy yokes 17 made of a soft magnetic material in a portion of a cover 18 which is made of a non-magnetic material and used for the prevention of entering of foreign matter and the fitting of the actuator by a method such as insertion molding.

The cover 18 is molded using high functional plastic generally called engineering plastic as a non-magnetic material. The dummy yokes 17 made of electromagnetic soft iron or the like are provided in a part of the circumference. The positions of the dummy yokes 17 are outside a position in which the magnetized surface of the magnet 1 is opposed to the stator 3. The dummy yokes 17 are located at positions which are not in contact with the stator 3 so as not to be influenced by a magnetic flux generated by the coil 2 while picking up a leakage magnetic flux from the magnet 1.

According to the insertion into the cover 18, the dummy yokes can be located at positions in which attraction acts on the magnet 1 and the influence of the coil 2 that generates the magnetic flux is small. When the magnet 1 has eight poles, for example, eight dummy yokes are uniformly arranged on the outer diameter side. Therefore, it is possible to change the cogging characteristic at the time of no energization. For example, when the dummy yokes 17 are located in the phase shown in FIG. 8, it is possible to increase a retaining force at a standby position of the rotor 5. That is, in a case other than the case where the stator 3 is excited, torque which acts on the magnet 1, so-called cogging torque can be adjusted according to a characteristic of the actuator. More specifically, retaining torque of the rotor 5 at each of start and end positions of rotation of the rotor 5 can be increased without a change in a rotational characteristic of the rotor 5 at the time of energization to the coil 2. Therefore, in the light quantity adjusting apparatus employing the actuator having the structure according to the fourth embodiment of the present invention (members such as the blades involved in light quantity adjustment are not shown), it is possible to improve the stability of the blades for blocking the opening portion of the base plate at the open position and the closed position. Other portions are identical to those in the first embodiment and the second embodiment and thus the description is omitted here.

(Fifth Embodiment)

Figure 9:
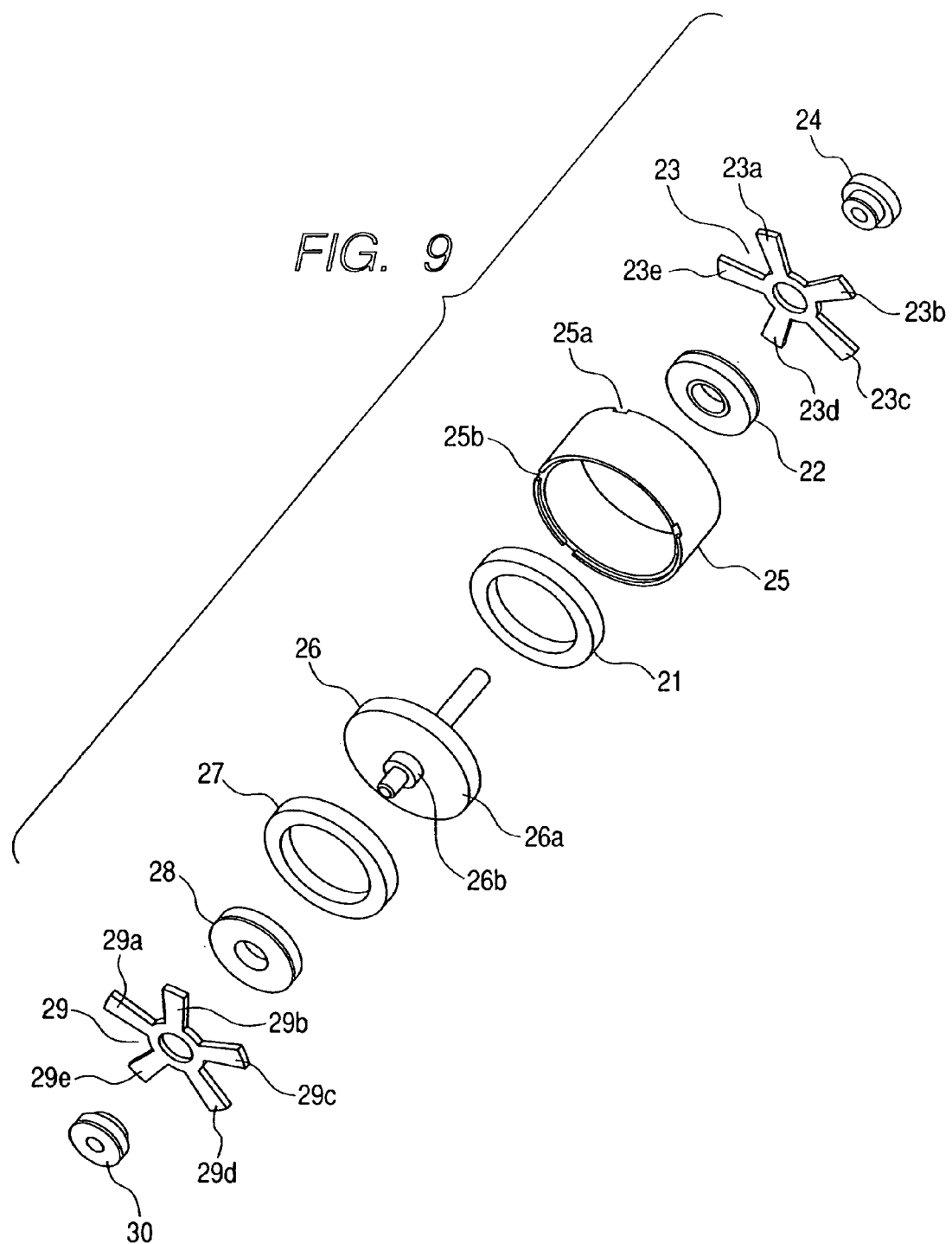
FIG. 9 is an exploded perspective view showing a stepping motor according to a fifth embodiment of the present invention.
Figure 10:
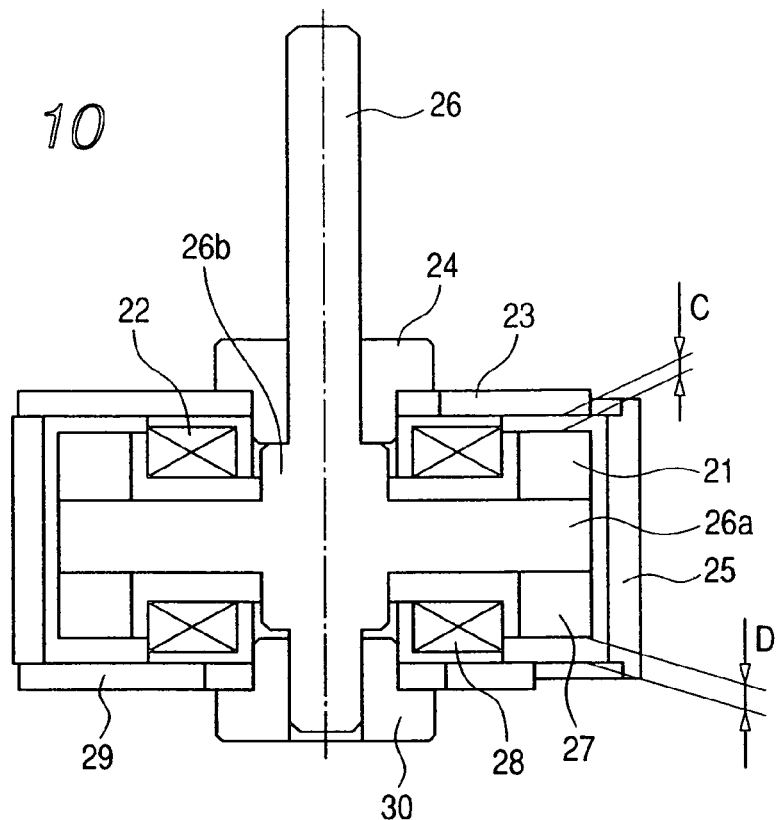
FIG. 10 is a sectional view in an axial direction, showing the stepping motor shown in FIG. 9.
Figure 11:
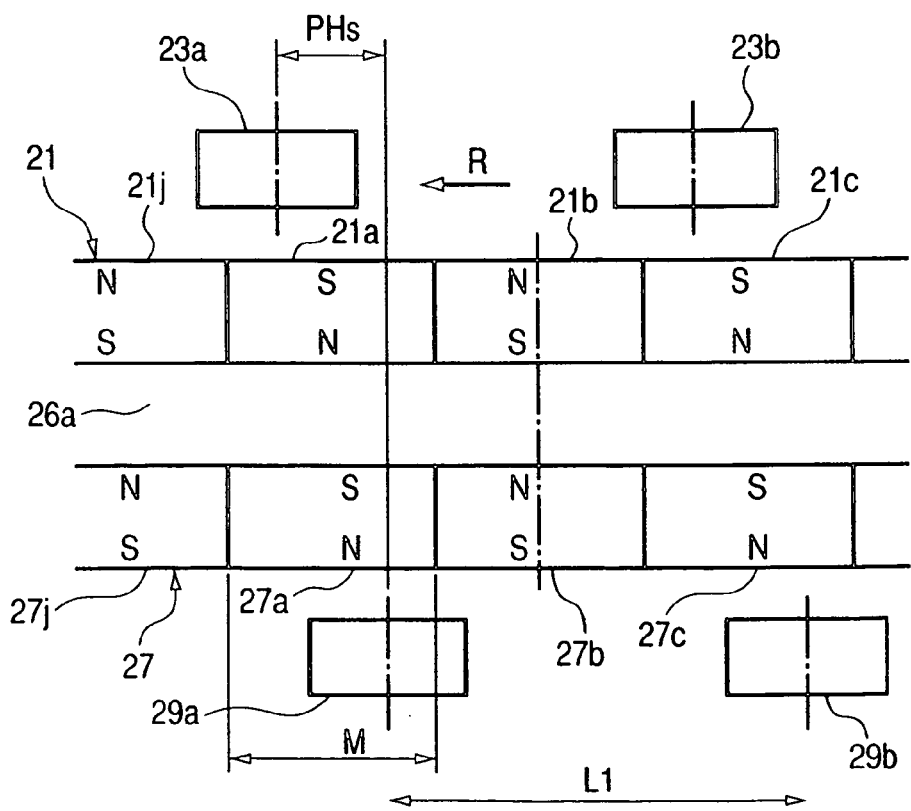
FIG. 11 is a schematic side view showing a phase relationship between a magnet and a stator in the stepping motor shown in FIG. 9.
Figure 12:
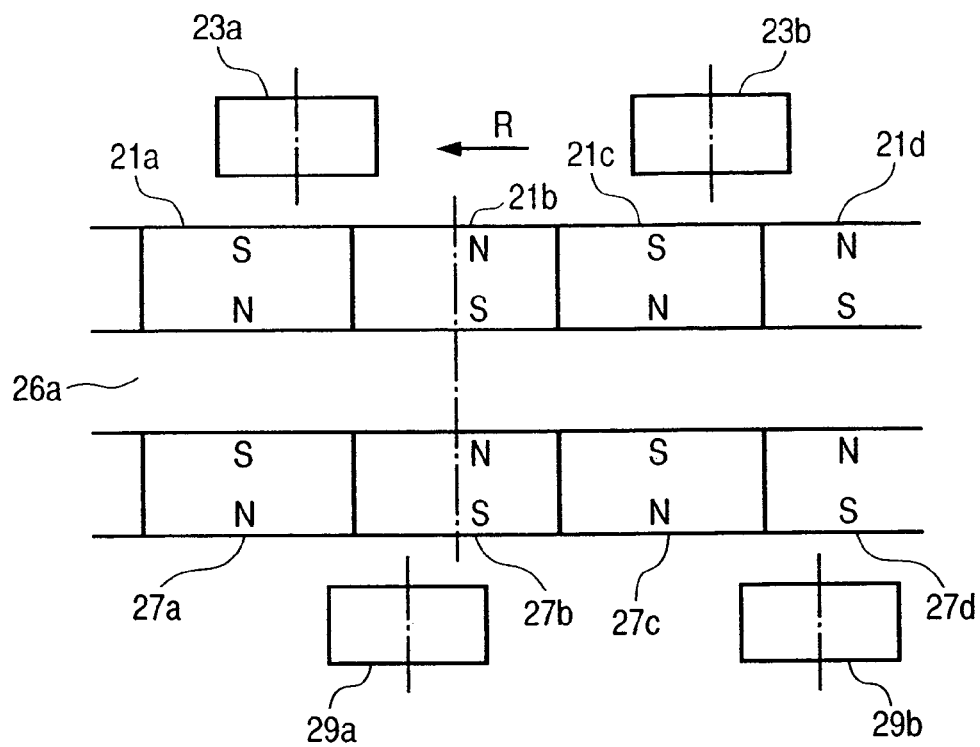
FIG. 12 is a schematic side view showing a state in which the magnet is rotated by 18 degrees from a state shown in FIG. 11 by switching energization to a coil.
Figure 13:
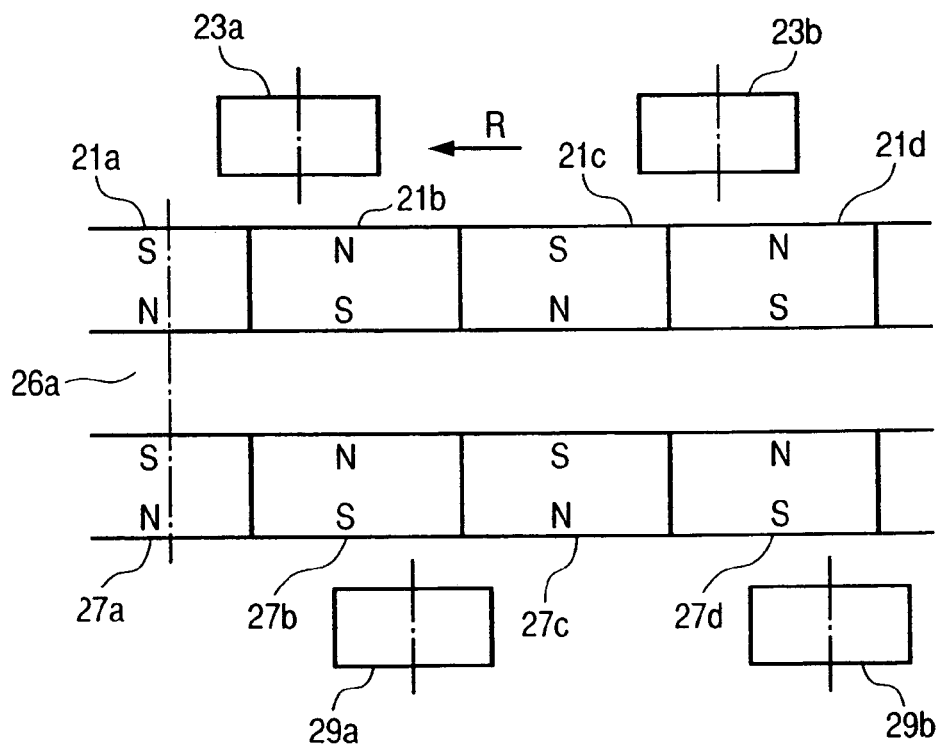
FIG. 13 is a schematic side view showing a state in which the magnet is rotated by 18 degrees from the state shown in FIG. 12 by switching energization to the coil.
Figure 14:
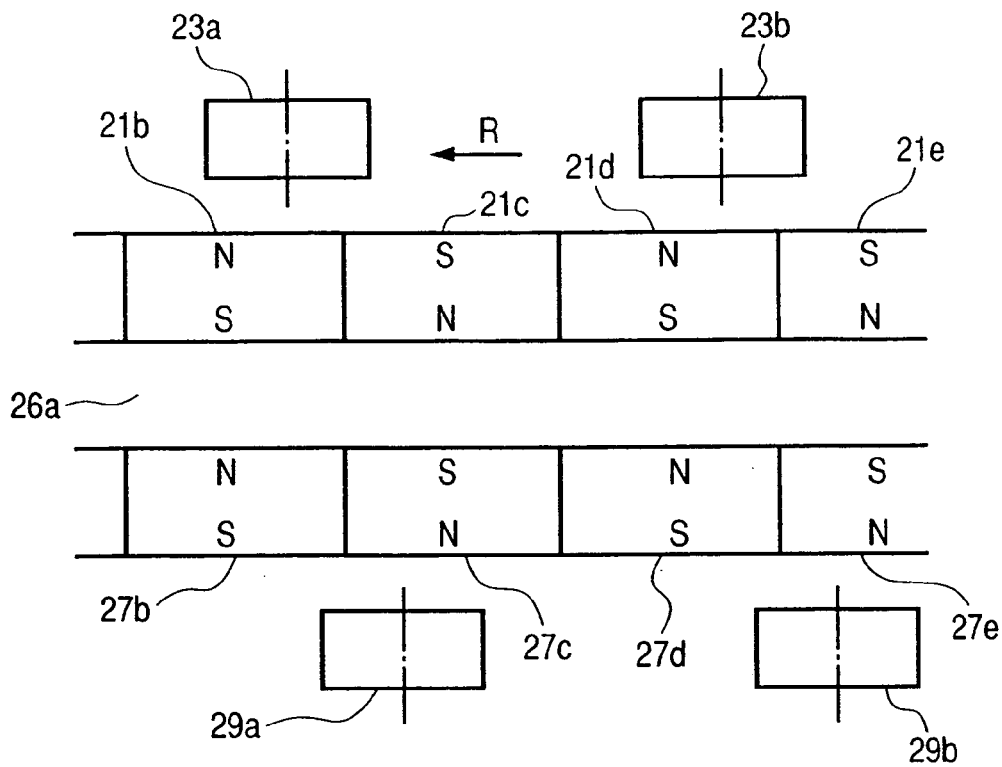
FIG. 14 is a schematic side view showing a state in which the magnet is rotated by 18 degrees from the state shown in FIG. 13 by switching energization to the coil.

FIGS. 9 to 14 show a stepping motor according to a fifth embodiment of the present invention. More specifically, FIG. 9 is an exploded perspective view showing the stepping motor. FIG. 10 is a sectional view in an axial direction, showing the stepping motor. FIG. 11 is a schematic side view showing a phase relationship between a magnet and a stator. FIG. 12 is a schematic side view showing a state in which the magnet is rotated by 18 degrees from the state shown in FIG. 11 by switching of energization to a coil. FIG. 13 is a schematic side view showing a state in which the magnet is rotated by 18 degrees from the state shown in FIG. 12 by switching of energization to the coil. FIG. 14 is a schematic side view showing a state in which the magnet is rotated by 18 degrees from the state shown in FIG. 13 by switching of energization to the coil.

In FIGS. 9 to 12, a first magnet 21 having a ring shape has magnetized portions which are formed by dividing a surface of the first magnet 21 which is perpendicular to the central axis thereof into P (P is an even number; P=10 in the fifth embodiment of the present invention) in a peripheral direction. The magnetized portions are alternately plane-magnetized in the N-pole and the S-pole. Here, the surface of the first magnet 21 which is opposed to a first stator 23 is magnetized. Magnetized portions 21a, 21c, 21e, 21g, and 21i (21e, 21g, and 21i are not shown) are magnetized in the S-pole and magnetized portions 21b, 21d, 21f, 21h, and 21j (21f and 21h are not shown) are magnetized in the N-pole.

The first magnet 21 is formed by compressing a bonded neodymium magnet. The first magnet 21 may be formed by injection molding or made of a ferrite system material. A second magnet 27 is made of the same part as that of the first magnet 21. That is, a surface of the second magnet 27 which is opposed to a second stator 29 is magnetized. Magnetized portions 27a, 27c, 27e, 27g, and 27i (27e, 27g, and 27i are not shown) are magnetized in the N-pole and magnetized portions 27b, 27d, 27f, 27h, and 27j (27f and 27h are not shown) are magnetized in the S-pole.

A first coil 22 is formed by winding a lead wire about a bobbin made of an insulating material and fixed to the first stator 23 at a substantially concentric position to the first magnet 21 on an inner peripheral surface side of the first magnet 21. A second coil 28 is made of the same part as that of the first coil 22.

The first stator 23 is made of a soft magnetic material and produced by a forging press process or the like. The first stator 23 includes: magnetic pole teeth 23a, 23b, 23c, 23d, and 23e which are formed in a comb-tooth shape and protrude in a direction perpendicular to the central axis thereof; a hole for holding a first bearing 24 (described later); and a protruding portion for adjusting a phase adjustment cutaway portion 25a of a case 25 to a phase of the magnetic pole teeth. The number of magnetic pole teeth is ½ of the number of poles (P) of the magnetized first magnet 21, that is, 5. All the magnetic pole teeth 23a to 23e of the first stator 23 are excited in the same pole (N-pole or S-pole) by energization to the first coil 22. A second stator 29 is made of the same part as that of the first stator 23. That is, the second stator 29 is made of a soft magnetic material and produced by a forging press process or the like. The second stator 29 includes: magnetic pole teeth 29a, 29b, 29c, 29d, and 29e which are formed in a comb-tooth shape and protrude in a direction perpendicular to the central axis thereof; a hole for holding a second bearing 30 (described later); and a protruding portion for adjusting a phase adjustment cutaway portion 25b of the case 25 to a phase of the magnetic pole teeth. The number of magnetic pole teeth is ½ of the number of poles (P) of the magnetized second magnet 27, that is, 5. All the magnetic pole teeth 29a to 29e of the second stator 29 are excited in the same pole (N-pole or S-pole) by energization to the second coil 28.

The first bearing 24 is fixed to the first stator 23 to smoothly rotate a rotor 26. The first bearing 24 is made of metal which is a soft magnetic material such as electromagnetic soft iron and produced by a sintering manufacturing method or the like. The first bearing 24 has a thrust abutment which can be in contact with a thrust abutment of one of flange portions 26b of the rotor 26. As a result, the first magnet 21 and the second magnet 27 are positioned relative to the first stator 23 and the second stator 29, respectively, in an axial direction. The second bearing 30 is fixed to the second stator 29 and made of the same part as that of the first bearing 24. That is, the second bearing 30 is made of metal which is a soft magnetic material such as electromagnetic soft iron and produced by a sintering manufacturing method or the like. The second bearing 30 has a thrust abutment which can be in contact with a thrust abutment of the other of the flange portions 26b of the rotor 26. As a result, the first magnet 21 and the second magnet 27 are positioned relative to the first stator 23 and the second stator 29, respectively, in the axial direction.

The case 25 is made of a soft magnetic material and has the cutaway portions 25a and 25b for adjusting the first stator 23 to the second stator 29 to obtain a predetermined phase and step portions for holding the first stator 23 and the second stator 29 at predetermined coaxiality. Here, a phase shift angle between the cutaway portions 25a and 25b is expressed by (360 degrees/2P), that is, 18 degrees. Therefore, the first stator 23 and the second stator 29 are shifted for assembly by 18 degrees in a rotational direction.

A rotor 26 is composed of a shaft portion rotatably supported by the first bearing 24 and the second bearing 30, a disk portion 26a having a surface perpendicular to the shaft portion, and the flange portions 26b. The rotor 26 is made of a soft magnetic material such as electromagnetic soft iron, having a small magnetic resistance. The first magnet 21 and the second magnet 27 are fixed to the rotor 26 such that different poles are opposed to each other. That is, for example, as shown in FIG. 11, the first magnet 21 and the second magnet 27 are bonded to the rotor 26 such that the magnetized portion 21a (S-pole) corresponds to the magnetized portion 27a (N-pole) through the disk portion 26a of the rotor 26 which is sandwiched therebetween. Boundaries between poles are aligned with each other. When a rotary magnet in which the two magnets are fixed is actually produced, a disk blank-shaped member made of a magnetic material is bonded to each of front and rear surfaces of the rotor 26 in advance and set for magnetization in a magnetization apparatus. Therefore, magnetic poles can be formed in the magnet. According to such a method, phases of the magnetic poles of each of the two magnets are determined based on arrangement of magnetization yokes of the magnetization apparatus and fixation positional precision of a work. Thus, a process such as phase adjustment for two poles can be omitted. In this embodiment, the magnets are magnetized after they are bonded to the rotor 26. A method of bonding the two magnets magnetized in advance to the rotor 26 may be used.

The stepping motor according to the fifth embodiment of the present invention has the two-layer structure in which two actuators, each of which is described in the first embodiment or the second embodiment, are stacked in the axial direction. The inner portion of the rotor to which the magnets are bonded is commonly used for two magnetic circuits for an A-phase and a B-phase, so that a combination of the two disk-shaped portions opposed to the stators is generally used as a single disk to reduce the number of parts. A magnetic flux has a characteristic in which it flows along, of magnetic paths, a path having a minimal magnetic resistance, that is, a short formed path. In other words, the magnetic flux passes through a surface of the disk portion to which each of the magnets is bonded in each phase in a thickness direction of the disk portion. When the disk portion has a predetermined thickness, the magnetic fluxes flowing through the respective magnetic circuits are unlikely to interfere with each other.

Here, the operation will be described. As shown in the sectional view of FIG. 10 (hatching indicating the section is omitted), three upper, middle, and lower units are provided. The upper unit is the first stator 23 to which the first bearing 24 and the first coil 22 are fixed. The middle unit is the rotor 26 whose surfaces (front and rear surfaces) are bonded to the first magnet 21 and the second magnet 27, respectively. The lower unit is the second stator 29 to which the second bearing 30 and the second coil 28 are fixed. When the first stator 23 and the second stator 29 are closely fixed to the step portions of the case 25, a distance between the thrust abutment of the first bearing 24 and the thrust abutment of the second bearing 24 becomes a predetermined interval. This distance is a distance obtained by adding an interval between the upper and lower flange portions 26b of the rotor 26 to a minimal margin required for rotation. As a result, a gap C between the first magnet 21 and the first stator 23 and a gap D between the second magnet 27 and the second stator 29 each become a constant interval. Therefore, the air gaps of a gap A and a gap B may be controlled with high precision, so that there is no case where the stepping motor is hard to assemble. FIG. 11 shows a state in which the rotor 26 is shifted to the first bearing 24 side. This indicates a shaft play of a motor (end play) in addition to the predetermined gaps C and D.

As shown in FIG. 11, the magnetic pole tooth 23a and the like of the first stator 23 and the magnetic pole tooth 29a and the like of the second stator 29 are shifted to each other in the rotational direction by an angle of PHs. A phase of a magnetization angle of the first magnet 21 is made equal to that of the second magnet 27. Reference L1 denotes an angular pitch between adjacent magnetic pole teeth of each of the stators and M denotes an angle corresponding to a magnetization width of each of the magnets. The reference L1 is expressed by (360 degrees×2/P). Here, L is 72 degrees. Reference M is expressed by (360 degrees/P). Here, M is 36 degrees. As a result, PHs is expressed by L1/2, that is, 18 degrees.

A group including the first magnet 21, the first coil 22, the first stator 23, the disk portion 26a, and the first bearing 24 is referred to as an A-phase unit. A group including the second magnet 27, the second coil 28, the second stator 29, the disk portion 26a, and the second bearing 30 is referred to as a B-phase unit.

First, a magnetic circuit of the A-phase unit will be described with reference to the sectional view of FIG. 10. When the first coil 22 located in the inner circumference is energized, magnetic fluxes are generated around the first coil 22. The magnetic fluxes reach the comb-tooth-shaped magnetic pole teeth 23a, 23b, 23c, 23d, and 23e of the first stator 23 which are located near the first coil 22 and opposed to the magnetized surface of the first magnet 21. The magnetic fluxes flow from the magnetic pole teeth to the disk portion 26a of the rotor 26 through the first magnet 21. After that, the magnetic fluxes flow from the disk portion 26a of the rotor 26 to the flange portion 26b which is located in the inner circumference and composes a shaft portion of the rotor 26. Then, the magnetic fluxes flow from the first bearing 24 to the first stator 23. As a result, the circulation of the magnetic fluxes is completed. The first stator 23, the disk portion 26a and flange portion 26b of the rotor 26, and the first bearing 24 each are made of a soft magnetic material such as SUY (electromagnetic soft iron), so that a magnetic loss is small. The first magnet 21 is plane-magnetized, so that the first magnet 21 can be thinned because it has a sufficient magnetic force even when a thickness thereof does not increase. The gap C between the first magnet 21 and the first stator 23 may be set to a minimal distance required for the rotator and the stator based on assembly and processing precision. The first magnet 21 is in direct contact with the disk portion 26a, so that there is no gap. Therefore, the air interval gap C between the first stator 23 and the disk portion 26a of the rotor 26 is sufficiently narrow, with the result that a magnetic loss is small. Thus, a loss of the magnetic circuit which is composed of the first coil 22, the first stator 23, the disk portion 26a, and the first bearing 24 is small.

First, a magnetic circuit of the B-phase unit will be described with reference to the sectional view of FIG. 10. When the second coil 28 located in the inner circumference is energized, magnetic fluxes are generated around the second coil 28. The magnetic fluxes reach the comb-tooth-shaped magnetic pole teeth 29a, 29b, 29c, 29d, and 29e of the second stator 29 which are located near the second coil 28 and opposed to the magnetized surface of the second magnet 27. The magnetic fluxes flow from the magnetic pole teeth to the disk portion 26a of the rotor 26 through the second magnet 27. After that, the magnetic fluxes flow from the disk portion 26a of the rotor 26 to the flange portion 26b which is located in the inner circumference and composes a shaft portion of the rotor 26. Then, the magnetic fluxes flow from the second bearing 30 to the second stator 29. As a result, the circulation of the magnetic fluxes is completed. The second stator 29, the disk portion 26a and flange portion 26b of the rotor 26, and the second bearing 30 each are made of a soft magnetic material such as SUY, so that a magnetic loss is small. The second magnet 27 is plane-magnetized, so that the second magnet 27 can be thinned because it has a sufficient magnetic force even when a thickness thereof does not increase. The gap D between the second magnet 27 and the second stator 29 may be set to a minimal distance required for the rotator and the stator based on assembly and processing precision. The second magnet 27 is in direct contact with the disk portion 26a, so that there is no gap. Therefore, the air interval gap D between the second stator 29 and the disk portion 26a of the rotor 26 is sufficiently narrow, with the result that a magnetic loss is small. Thus, a loss of the magnetic circuit which is composed of the second coil 28, the second stator 29, the disk portion 26a, and the second bearing 30 is small.

Therefore, even when a current flowing into the coil is small, a large number of magnetic fluxes can be generated. Thus, a thin stepping motor having high output and high efficiency is obtained because strong repulsion and attraction from the magnet are used.

Next, the rotating operation will be described. As describe above, FIGS. 11 to 14 are partial side view showing the phase relationship between twelve magnets and two stators in the stepping motor shown in FIGS. 9 and 10. For the sake of understanding, the coils and the like are not shown in FIGS. 11 to 14. Hereinafter, the rotating drive of the stepping motor will be described with reference to FIGS. 9 to 14.

FIG. 11 shows a state in which the first coil 22 is positively energized to excite the magnetic pole teeth 23a, 23b, 23c, 23d, and 23e of the first stator 23 in the N-pole and simultaneously the second coil 28 is positively energized to excite the magnetic pole teeth 29a, 29b, 29c, 29d, and 29e of the second stator 29 in the S-pole. In this time, torque is generated to shift the center of each of the magnetized portions 21a, 21c, 21e, 21g, and 21i of the upper surface of the first magnet 21, which are magnetized in the S-pole, to the center of each of the magnetic pole teeth 23a, 23b, 23c, 23d, and 23e of the first stator 23 (in a direction indicated by an arrow R in FIG. 11). In addition, torque is generated to shift the center of each of the magnetized portions 27a, 27c, 27e, 27g, and 27i of the lower surface of the second magnet 27, which are magnetized in the N-pole, to the center of each of the magnetic pole teeth 29a, 29b, 29c, 29d, and 29e of the second stator 29 (in a direction reverse to the direction indicated by the arrow R in FIG. 11). Then, the balance in the rotational direction is maintained in the state shown in FIG. 11, so that the rotor 26 stops.

Next, while the first coil 22 is positively being energized, that is, while the magnetic pole teeth 23a to 23e of the first stator 23 are being excited in the N-pole, when the energization to the second coil 28 is switched from the state shown in FIG. 11 to reverse energization, the magnetic pole teeth 29a to 29e of the second stator 29 are excited in the N-pole. Then, torque is generated to shift each of the magnetized portions 27b, 27d, 27f, 27h, and 27j of the lower surface of the second magnet 27, which are magnetized in the S-pole, to the center of each of the magnetic pole teeth 29a to 29e of the second stator 29. Therefore, the rotor 26 starts to rotate in the direction indicated by the arrow R in FIG. 11. After that, the balance is maintained in the state shown in FIG. 12, so that the rotor 26 stops. This state is a state in which a combination of the first magnet 21 and the second magnet 27, that is, the rotor 26 is rotated in the direction indicated by the arrow R by 18 degrees from the state shown in FIG. 11.

Next, while the second coil 28 is reversely being energized, that is, while the magnetic pole teeth 29a to 29e of the second stator 29 are being excited in the N-pole, when the energization to the first coil 22 is switched from the state shown in FIG. 12 to reverse energization, the magnetic pole teeth 23a to 23e of the first stator 23 are excited in the S-pole. Then, torque is generated to shift each of the magnetized portions 21b, 21d, 21f, 21h, and 21j of the upper surface of the first magnet 21, which are magnetized in the N-pole, to the center of each of the magnetic pole teeth 23a to 23e of the first stator 23. Therefore, the rotor 26 starts to rotate in the direction indicated by the arrow R in FIG. 11. After that, the balance is maintained in the state shown in FIG. 13, so that the rotor 26 stops. This state is a state in which a combination of the first magnet 21 and the second magnet 27, that is, the rotor 26 is rotated in the direction indicated by the arrow R by 18 degrees from the state shown in FIG. 12.

Next, while the first coil 22 is reversely being energized, that is, while the magnetic pole teeth 23a to 23e of the first stator 23 are being excited in the S-pole, when the energization to the second coil 28 is switched from the state shown in FIG. 13 to positive energization, the magnetic pole teeth 29a to 29e of the second stator 29 are excited in the S-pole. Then, torque is generated to shift each of the magnetized portions 27b, 27d, 27f, 27h, and 27j of the lower surface of the second magnet 27, which are magnetized in the S-pole, to the center of each of the magnetic pole teeth 29a to 29e of the second stator 29. Therefore, the rotor 26 starts to rotate in the direction indicated by the arrow R in FIG. 11. After that, the balance is maintained in the state shown in FIG. 14, so that the rotor 26 stops. This state is a state in which a combination of the first magnet 21 and the second magnet 27, that is, the rotor 26 is rotated in the direction indicated by the arrow R by 18 degrees from the state shown in FIG. 13.

As described above, when the energization to the first coil 22 and the second coil 28 is switched between positive energization and reverse energization in order, a combination of the first magnet 21 and the second magnet 27, that is, the rotor 26 rotates to positions corresponding to energization phases in order.

According to the structure described in the fifth embodiment of the present invention, a stepping motor which is thin in the axial direction without a reduction in efficiency is obtained. Magnetic constituent elements are (a) the A-phase stator (magnetic pole teeth), (b) the A-phase magnet and A-phase coil, (c) the rotor disk portion commonly used for both the A-phase and the B-phase, (d) the B-phase magnet and the B-phase coil, and (e) the B-phase stator (magnetic pole teeth), which are shown in order along the axial direction. Thus, the stepping motor can be thinned.

Such a two-phase stepping motor in which two-layer structures, in each of which the magnet and the coil are fundamentally sandwiched using the stator, are stacked can be produced at low cost and thinned because the number of parts is small. In addition, the two-phase stepping motor is easily assembled because the number of stacks in the axial direction is small. Those reasons will be described below.

First, the two-layer actuators, each of which is described in the first embodiment or the second embodiment, are stacked in the axial direction. The two actuators are fixed to the single rotor. The inner portion of the single rotor is commonly used for a part of each of the two magnetic circuits for the A-phase and the B-phase.

Secondly, the two magnets, that is, the first magnet 21 and the second magnet 27 each having the disk shape are fixed to the disk portion 26a of the rotor 26 made of the soft magnetic material. The first stator 23 excited by the first coil 22 and the second stator 29 excited by the second coil 28 are opposed to the magnetized surface of the first magnet 21 and the magnetized surface of the second magnet 27, respectively. As a result, the number of types of air gaps between the stator and the magnets is one for each of the A-phase and the B-phase, that is, two in total.

Thirdly, the surface of each of the first magnet 21 and the second magnet 27 which is perpendicular to the axis as the center of rotation is divided to be alternately magnetized in different poles.

Fourthly, the respective magnetic pole teeth of each of the first stator 23 and the second stator 29 are constituted by arranging comb teeth extended in a radial direction in the entire circumference.

Fifthly, the first magnet 21 and the second magnet 27 are bonded to the rotor 26 such that the phases of the magnetic poles thereof are equal to each other. The first stator 23 and the second stator 28 are bonded to the case such that the phases of the magnetic poles thereof are shifted to each other by an angle obtained by dividing 360° by twice the number of poles of magnetization.

Sixthly, the first magnet 21 and the second magnet 27 are located outside the apparatus and the first coil 22 and the second coil 28 are located inside the inner peripheral surface on substantially the same axis at substantially the same height.

Seventhly, the first bearing 24 and the second bearing 30 each are made of the soft magnetic material.

Eighthly, the number of magnetic pole teeth provided in each of the first stator 23 and the second stator 29 is ½ of the number of magnetic poles of the magnetized magnet.

Thus, although the two-phase drive stepping motor has the two-layer structure in which the two actuators, each of which is the same as that described in the first embodiment or the second embodiment, are stacked in the axial direction, the rotor is a single part, so that the number of parts is small. A magnetic flux has a characteristic in which it flows along, of magnetic paths, a path having a minimal magnetic resistance, that is, a short formed path. The magnetic flux passes through a surface of the disk portion to which each of the magnets is bonded in each phase in the thickness direction of the disk portion, so that the interference between the magnetic fluxes flowing through the respective magnetic circuits is small.

The magnetic flux generated by the energization to the first coil 22 crosses the first magnet 21 located between the first stator 23 and the disk portion 26a of the rotor 26, so that an electromagnetic force is effectively caused. The magnetic flux generated by the energization to the second coil 28 crosses the second magnet 27 located between the second stator 29 and the disk portion 26a of the rotor 26, so that an electromagnetic force is effectively produced. The first magnet 21 and the second magnet 27 are integrally formed with the disk portion 26a of the rotor 26. The first coil 22 is fixed to the first stator 23 and the second coil 28 is fixed to the second stator 29. As a result, the number of types of air gaps between the stator and the magnets is one for each of the A-phase and the B-phase, that is, two in total. The number of parts becomes small. The entire stepping motor is composed of the three portions. Therefore, it is easily assembled and an assembly cost can be reduced. The two magnets are fixed to the front and rear surfaces of the disk portion 26a of the rotor 26, so that two blank members each made of a magnetic material before magnetization can be bonded to the rotor 26 and then processed for magnetization by a magnetization apparatus. Thus, it is unnecessary to bond magnetized magnets to the rotor with phase adjustment and assembly becomes easier. For example, a bonded magnet used as a material of the magnet is generally likely to break. When the bonded magnet is bonded to the rotor 26 made of electromagnetic soft iron or the like, a mechanical strength can be increased. The disk portion 26a of the rotor 26 also serves as a back metal, so that the stepping motor can be maintained to a magnetically stable state, a magnetic strength thereof is increased, and a reduction in magnetic force due to a change in temperature is suppressed.

The surface of the magnet 21 which is perpendicular to the axial direction is magnetized, so that the stepping motor can be thinned as compared with a stepping motor using a cylindrical magnet whose outer peripheral surface is magnetized. Each of the first stator 23 and the second stator 29 is composed of comb-teeth extended in the radial direction, with the result that sizes thereof in the axial direction can be reduced as compared with that of a stator composed of comb-teeth extended in the axial direction. The stepping motor has not a structure in which a set of inner and outer teeth is opposed to a magnet for the transmission of a magnetic flux but a structure in which the magnetic flux is allowed to flow from each magnetic pole tooth into the magnet. As a result, the number of magnetic pole teeth per phase may be ½ of the number of magnetic poles of the magnetized magnet. Thus, as compared with a conventional stepping motor in which the number of magnetic pole teeth per phase is equal to the number of magnetic poles of the magnetized magnet, it is advantageous in workability and mechanical strength with respect to a width of each of the magnetic pole teeth and a gap therebetween particularly in the case where the number of magnetic poles of the stepping motor is intended to increase.

The magnet is located on an outermost side (outer peripheral side) in the inner portion of the motor, so that a radius of the magnet becomes larger, which is advantageous to convert a generated force into large torque. In the same view, even when the magnet exists in a location having a small radius, a total percentage of the magnet that contributes to increased torque is small. Thus, a width of the magnet on a surface thereof which is perpendicular to the axial direction is narrowed and a volume of the coil located inside the magnet is increased according to the narrowed width, with the result that space balance efficiency is high and a characteristic of the stepping motor can be improved. The coil is located at the same height as that of the magnet, so that the stepping motor can be thinned without an increase in height in the axial direction.

In the two-phase stepping motor, the phases of the two magnetized magnets are made equal to each other and the phases of the two stators are shifted to each other by the angle obtained by dividing 360 degrees by twice the number of poles of magnetization. Therefore, two magnets can be formed by simultaneously magnetizing two magnetic materials bonded to the rotor. The two-phase stepping motor using two coils, the first coil 22 and the second coil 28 is used, so that control thereof is easy and an electrical drive circuit is simple. Each of the stators has the magnetic pole teeth formed along the entire circumference at regular pitches. Thus, an area of each of the stators opposed to the magnets can be increased, with the result that it is possible to maximally use the magnetic fluxes from the magnets. Each of the bearings is made of the soft magnetic material, so that the magnetic fluxes passing through the bearings are unlikely to saturate. Thus, there is no reduction in efficiency.

The coils 22 and 28 are surrounded by the stators each made of the soft magnetic material and the like, so that the amount of leakage magnetic flux from the magnetic circuits is small. Therefore, there is no reduction in efficiency. The driving force is caused in a range corresponding to the entire circumference, so that an unnecessary force in a transverse direction is unlikely to cause when the driving force is converted into torque. Thus, vibration, noise, non-uniform rotation in the stepping motor are unlikely to cause, thereby obtaining the stepping motor having high stop position precision.

According to the fifth embodiment of the present invention, the rotor and the bearings are provided in addition to minimal elements for the electromagnetic driving apparatus, such as the magnets, the stators, and the coils, so that the number of parts is small. Each element has a flat shape which is simple and easy to produce, so that a manufacturing cost becomes lower.

(Sixth Embodiment)

Figure 15:
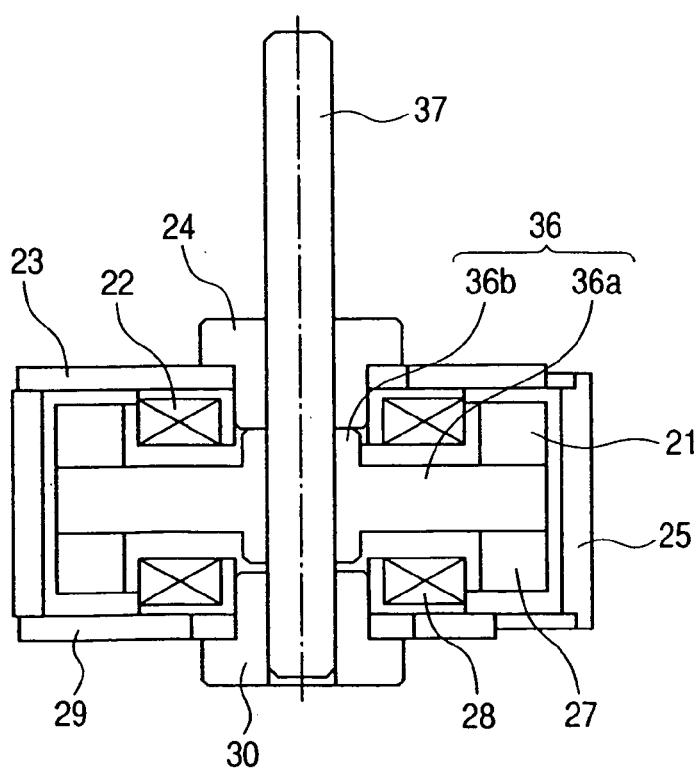
FIG. 15 is a sectional view in an axial direction, showing a stepping motor according to a sixth embodiment of the present invention.

FIG. 15 is a sectional view showing a stepping motor according to a sixth embodiment of the present invention. As compared with the fifth embodiment, the rotor 26 is divided into two parts, that is, a disk 36 and a shaft 37. The disk 36 is made of a soft magnetic material and a stainless steel rod or the like is used as the shaft 37. Other portions are identical to those in the fifth embodiment and thus the description is omitted here.

A magnetic flux generated around the coil flows through the stator near the coil, the magnet, the disk 36, the flange portion, the bearing, and the stator in order. Here, the disk 36 bonded to the magnet and the flange portion each are made of a soft magnetic material such as electromagnet soft iron. A stainless steel rod material having high rigidity and hardness is used as the shaft 37, so that an available rod material having a high performance and a low cost can be used as the shaft 37. Therefore, when the disk 36 is processed by pressing or the like, a total part cost reduces. Even in this case, two blank members each made of a magnetic material before magnetization can be bonded to the disk 36 in advance and then processed for magnetization by a magnetization apparatus. Thus, it is unnecessary to perform assembly with phase adjustment for magnetized magnets.

(Seventh Embodiment)

Figure 16:
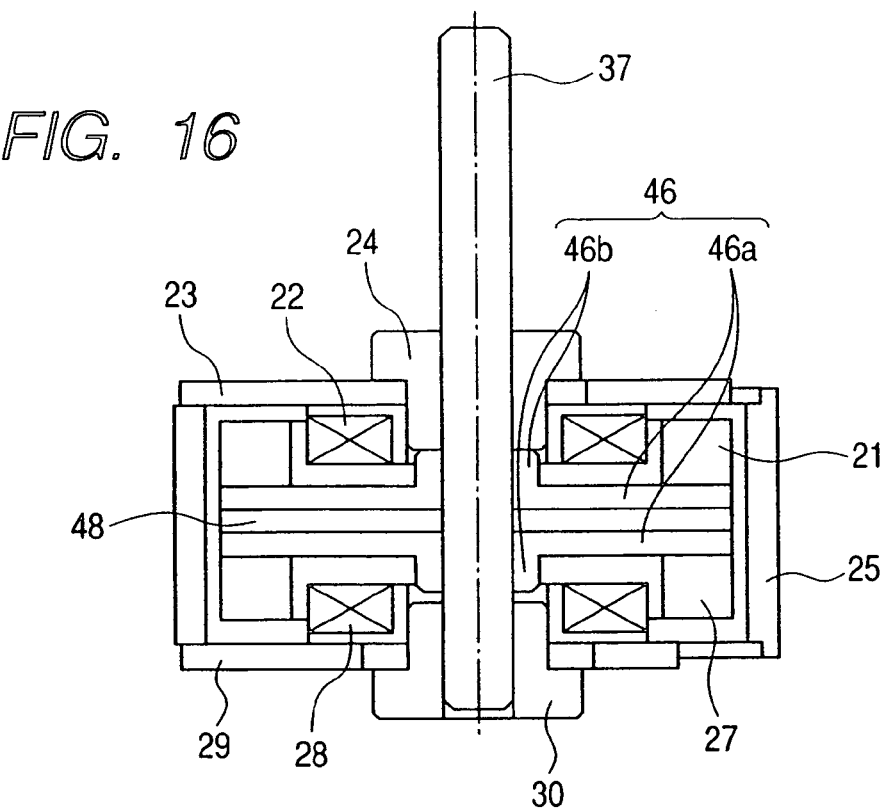
FIG. 16 is a sectional view in an axial direction, showing a stepping motor according to a seventh embodiment of the present invention.

FIG. 16 is a sectional view showing a stepping motor according to a seventh embodiment of the present invention. As in the sixth embodiment, an available rod material made of stainless steel is used as the shaft 37 of the rotor. However, a rotor 46 to which the two magnets are bonded is divided into two disk portions 46*a*. A spacer 48 such as PC is interposed as an air gap between the two disk portions 46*a*. As a result, the two magnets, the two disk portions, and the spacer are integrally formed with the shaft 37. Other portions are identical to those in the sixth embodiment and thus the description is omitted here.

A magnetic flux generated around the coil flow through the stator (23; 29) near the coil (22; 28), the magnet (21; 27), the disk portion 46*a* of the rotor, the flange portion 46*b*, the bearing (24; 30), and the stator (23; 29) in order. Therefore, the A-phase magnetic circuit and the B-phase magnetic circuit do not interfere with each other in the disk portions 46*a* of the rotor 46, so that output torque of the rotor 46 increases. Even in this case, two blank members each made of a magnetic material before magnetization can be bonded to the disk portions 46*a* in advance and then magnetized by a magnetization apparatus. Thus, it is unnecessary to perform assembly with phase adjustment for magnetized magnets.

(Eighth Embodiment)

Figure 17:
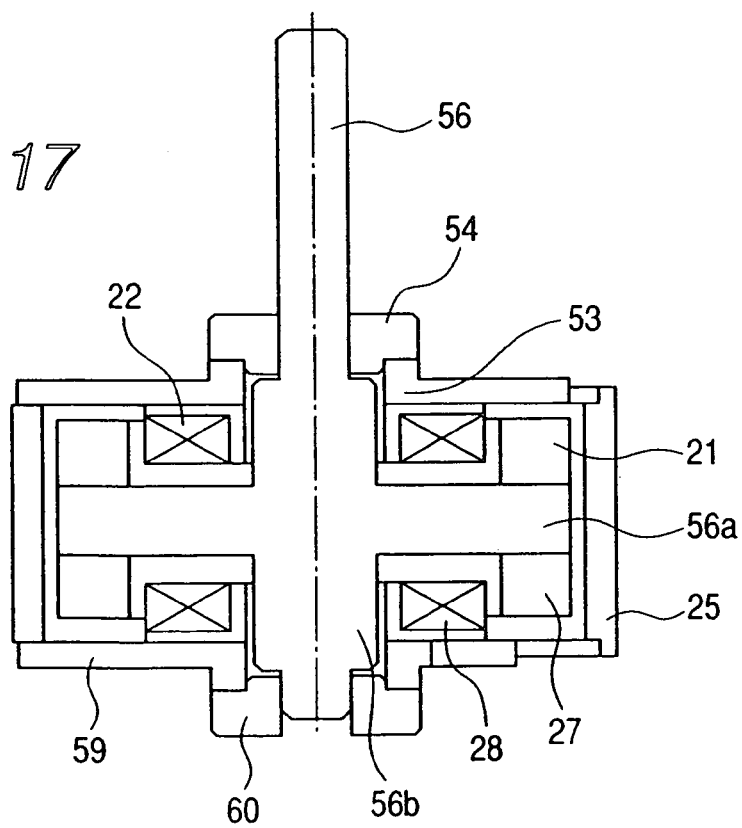
FIG. 17 is a sectional view in an axial direction, showing a stepping motor according to an eighth embodiment of the present invention.
Figure 18:
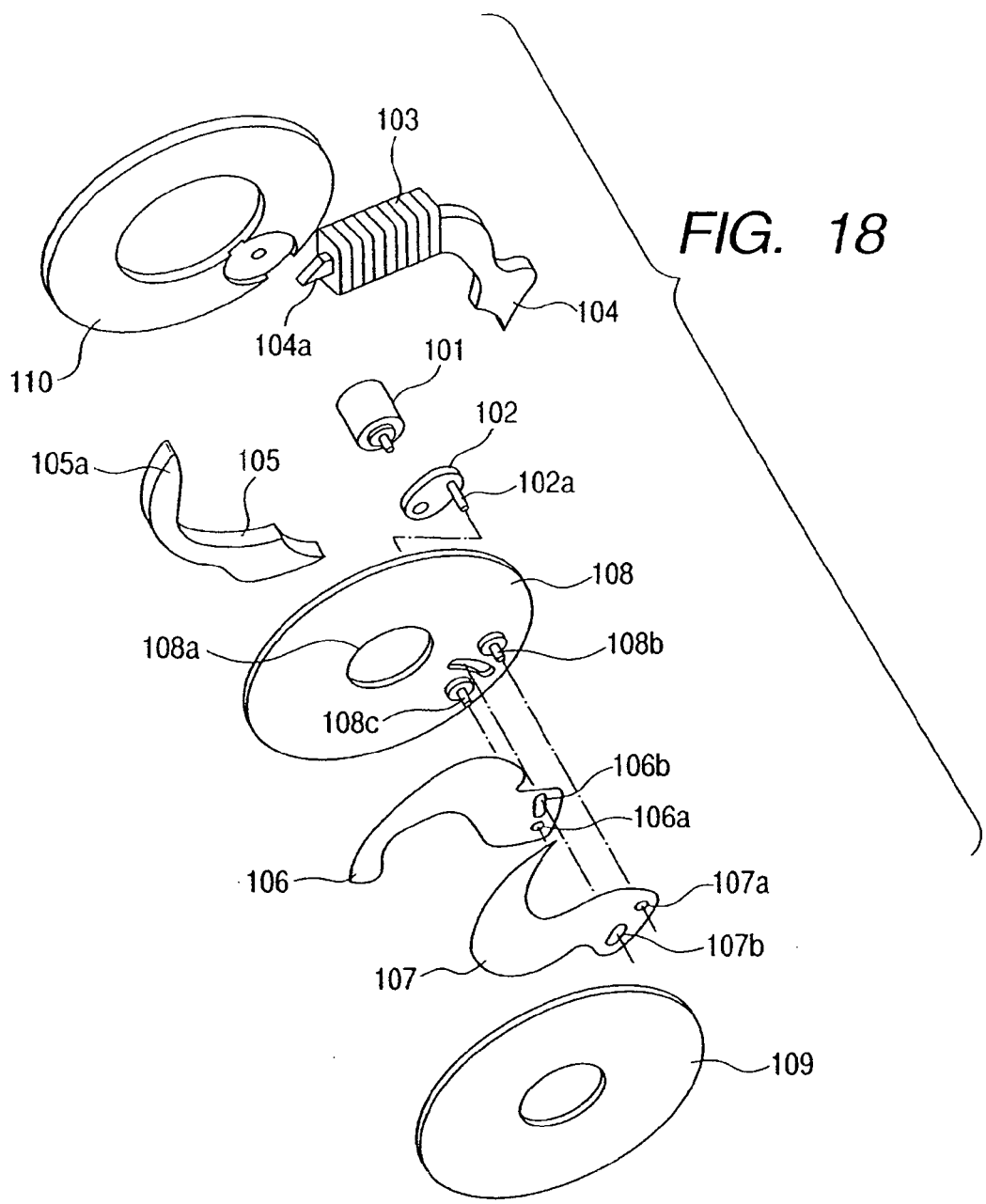
FIG. 18 is an exploded perspective view showing an example of a conventional shutter apparatus.
Figure 19:
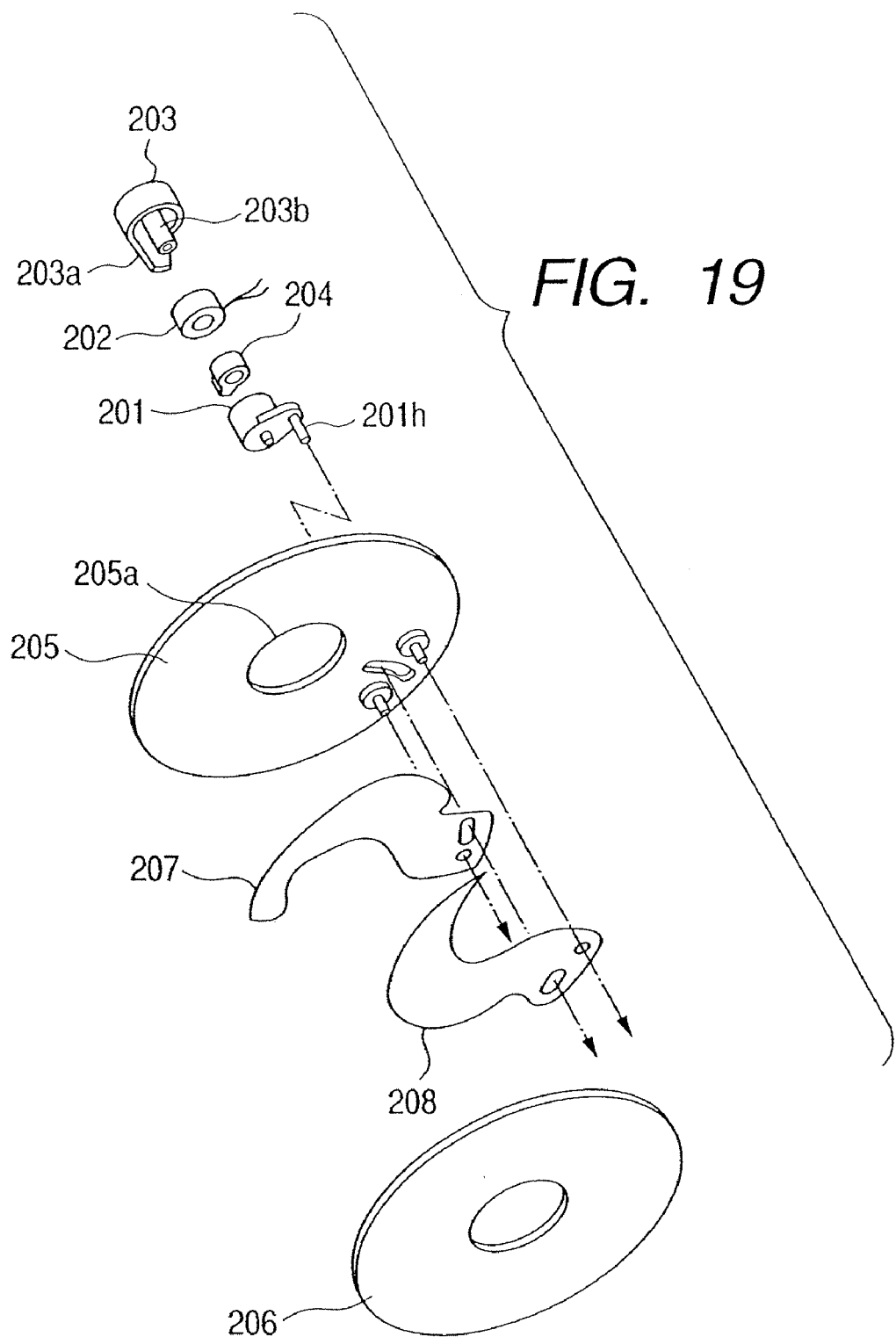
FIG. 19 is an exploded perspective view showing another example of a conventional shutter apparatus.
Figure 20:
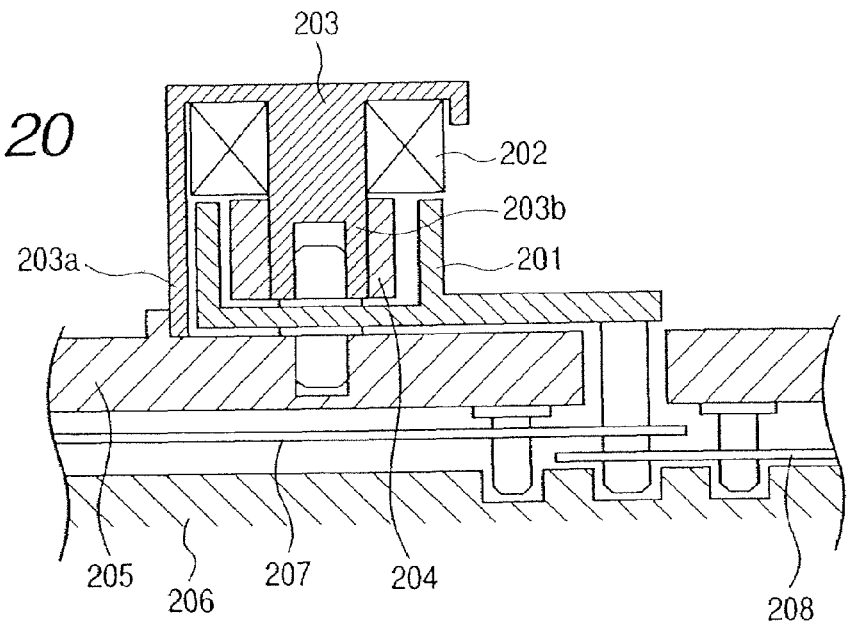
FIG. 20 is a sectional view showing a light quantity adjusting apparatus shown in FIG. 19.
Figure 21:
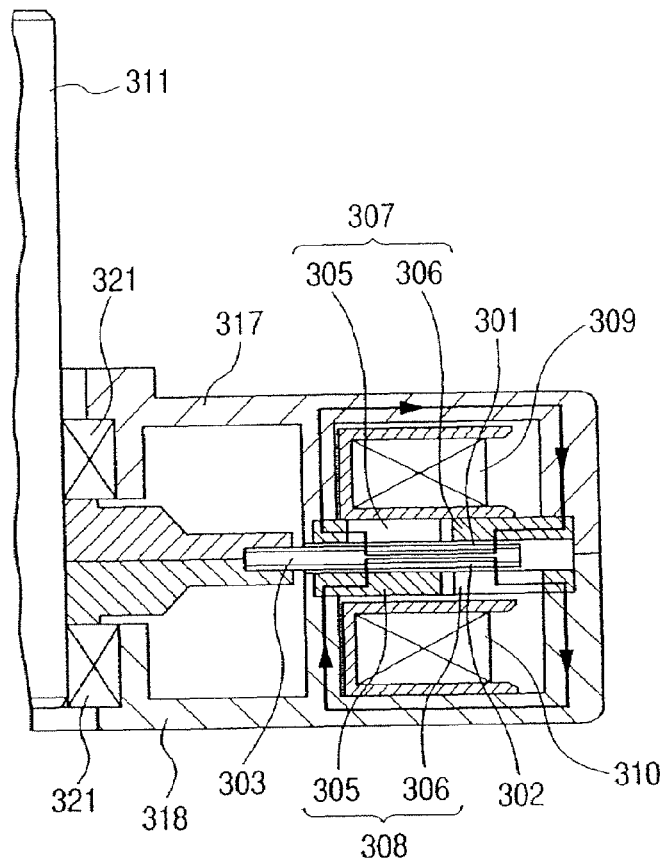
FIG. 21 is a sectional view in an axial direction, showing a conventional stepping motor.
Figure 22:
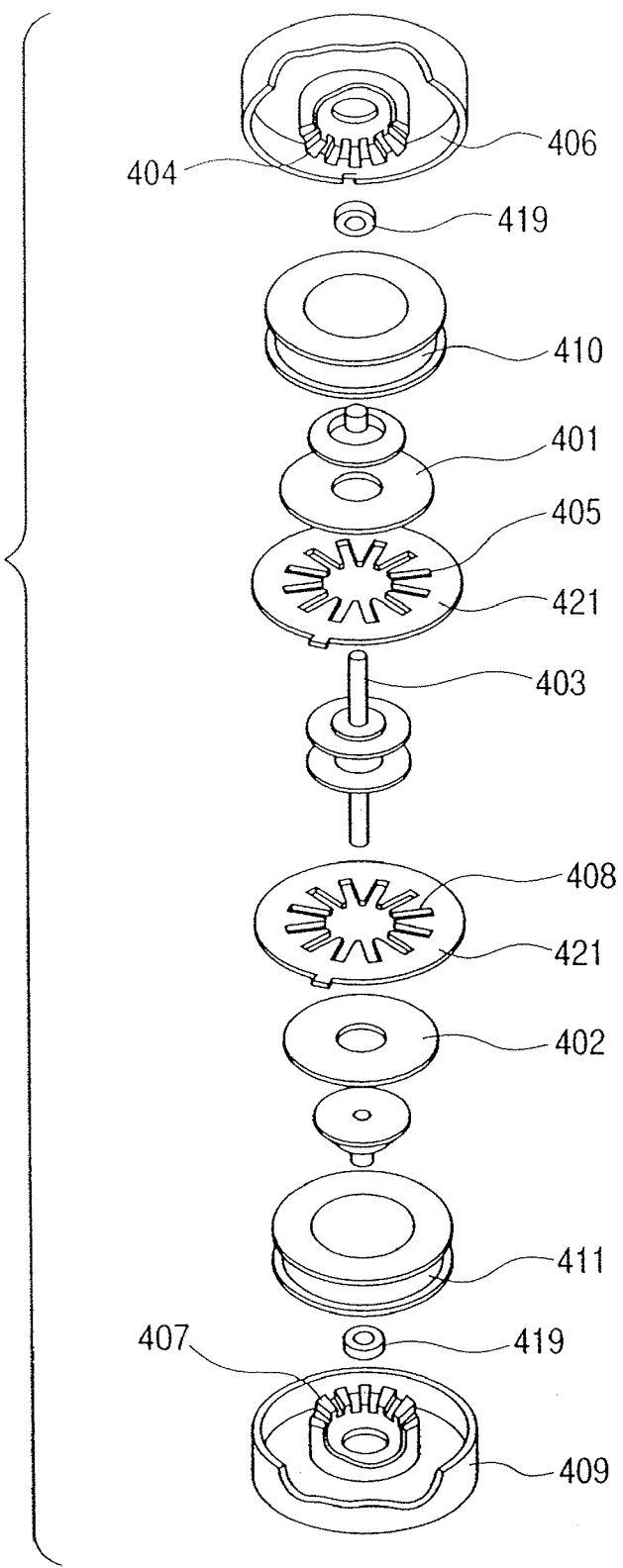
FIG. 22 is an exploded perspective view showing another conventional stepping motor.
Figure 23:
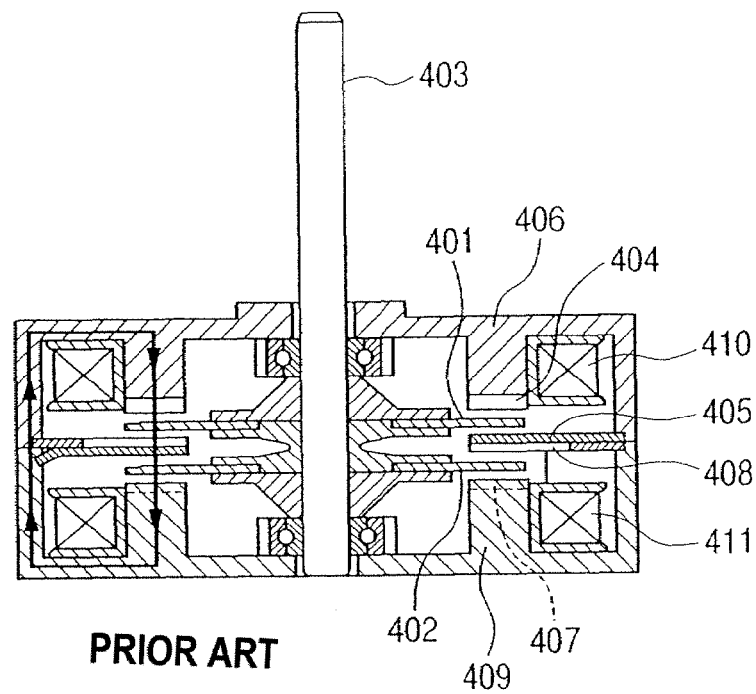
FIG. 23 is a sectional view in an axial direction, showing the stepping motor shown in FIG. 22.
Figure 24:
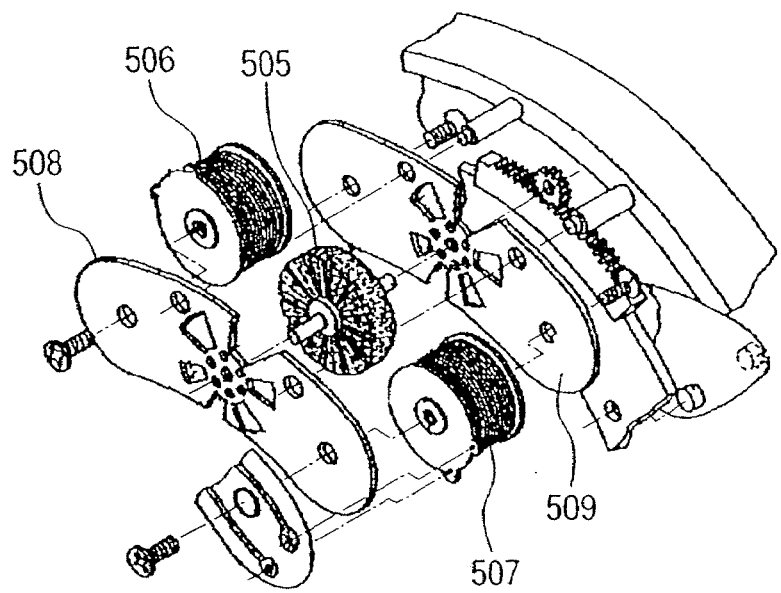
FIG. 24 is a perspective view showing an exposure quantity adjusting apparatus provided with another conventional thin stepping motor.

FIG. 17 is a sectional view showing a stepping motor according to an eighth embodiment of the present invention. As compared with the fifth embodiment, bearings 54 and 60 for the rotor 56 each are made of oil metal of sintered brass which is a non-magnetic material. Based on such a condition, the shapes of the rotor 26 and the stators 23 and 29 in the fifth embodiment are partially modified to form a rotor 56 and stators 53 and 59. Other portions are identical to those in the fifth embodiment and thus the description is omitted here.

A magnetic flux generated around the coil flow through the stator (53; 59) near the coil, the magnet (21; 27), a disk portion 56*a* of the rotor 56, a flange portion 56*b*, and the stator in order. Here, each of the bearings 54 and 60 is made of oil metal of sintered brass which is a non-magnetic material. The flange portion 56*b* of the rotor 56 is extended to a height of the stator. Therefore, a magnetic circuit in which the magnetic flux directly flows from the rotor 56 to the stator (53; 59) is provided. As a result, attraction does not occur between the flange portion 56*b* of the rotor 56 magnetized by being bonded to the magnet and the bearings 54 and 60. It is possible to use the bearing made of oil metal of sintered brass which is more available, so that a rotational loss and a cost can be reduced.

As described above, according to any one of the above embodiments of the present invention, there can be provided an actuator which maintains high efficiency, can react to an increase in pole, has a high part fit, and can be manufactured at low cost while it is thinned, and a light quantity adjusting apparatus using the actuator as a driving source.

In addition, there can be provided a high performance stepping motor which can react to an increase in pole, has a high part fit, and can be manufactured at low cost while it is thinned.

This application claims priority from Japanese Patent Application Nos. 2004-000796 filed Jan. 6, 2004 and 2004-144377 filed May 14, 2004, which are hereby incorporated by reference herein.

What is claimed is:

1. An actuator, comprising:
   a magnet which is formed in a ring shape, in which at least one surface perpendicular to a central axis thereof is divided in a circumferential direction and alternately plane-magnetized in different poles;
   a stator including a plurality of magnetic pole teeth opposed to the magnetized surface of the magnet;
   a rotor which includes a shaft portion held to be rotatable around the central axis, and a disk portion whose surface perpendicular to the shaft portion is bonded to the magnet, and which is made of a soft magnetic material for passage of magnetic fluxes of a magnetic circuit;
   a bearing which is fixed to the stator, rotatably supports the shaft portion of the rotor, and is made of a soft magnetic material; and a coil which is coaxially located at inner circumference side of the magnet, is located at substantially the same position of the magnet in a direction along the central axis, is fixed to the stator, and excites the stator and the disk portion, wherein the magnet is fixed to a surface which is a surface of an outer circumference side of the disk portion of the rotor, and which is opposed to the stator, the coil is fixed to a surface which is a surface on an inner circumference side of the stator, and which is opposed to the magnet, and the rotor is positioned in an axial direction by making a tip protruding portion of the axis portion be in contact with a bottom side of the bearing and the bearing is extended such that a tip end surface thereof is close to the disk portion of the rotor.

2. An actuator according to claim 1, further comprising:
a dummy yoke which is located at an outer circumference side of the magnet, bonded to a cover made of a non-magnetic material, and made of a soft magnetic material.

3. A light quantity adjusting apparatus, comprising:
a magnet which is formed in a ring shape, in which at least one surface perpendicular to a central axis thereof is divided in a circumferential direction and alternately plane-magnetized in different poles;

a stator including a plurality of magnetic pole teeth opposed to the magnetized surface of the magnet;

a rotor which includes a shaft portion held to be rotatable around the central axis and a disk portion whose surface perpendicular to the shaft portion is bonded to the magnet, and which is made of a soft magnetic material for passage of magnetic fluxes of a magnetic circuit;

a bearing which is fixed to the stator, rotatably supports the shaft portion of the rotor, and is made of a soft magnetic material;

a coil which is coaxially located at inner circumference side of the magnet, is located at substantially the same position of the magnet in a direction along the central axis, is fixed to the stator, and excites the stator and the disk portion;

an output member which operates in response to rotation of the rotor;

a base plate including an opening portion; and a light quantity adjusting member which is driven by the output member and moves above the opening portion of the base plate to change a quantity of light passing through the opening portion, wherein the magnet is fixed to a surface which is a surface of an outer circumference side of the disk portion of the rotor, and which is opposed to the stator, the coil is fixed to a surface which is a surface on an inner circumference side of the stator, and which is opposed to the magnet, and the rotor is positioned in an axial direction by making a tip protruding portion of the axis portion be in contact with a bottom side of the bearing and the bearing is extended such that a tip end surface thereof is close to the disk portion of the rotor.

* * * * *

UNITED STATES PATENT AND TRADEMARK OFFICE
CERTIFICATE OF CORRECTION

PATENT NO. : 7,242,123 B2
APPLICATION NO. : 11/411112
DATED : July 10, 2007
INVENTOR(S) : Miyawaki It is certified that error appears in the above-identified patent and that said Letters Patent is hereby corrected as shown below:

COLUMN 1:
Line 60, "becomes" should read --is in--.

COLUMN 5:
Line 18, "cause," should read --occur,--.
Line 63, "gap" should read --gaps--.

COLUMN 6:
Line 15, "flax" should read --flux--.
Line 23, "and" should read --and is--.
Line 50, "cause." should read --occur.--.

COLUMN 7:
Line 53, "gap" should read --gaps--.

COLUMN 8:
Line 17, "flax" should read --flux--.
Line 27, "and" should read --and is--.

COLUMN 10:
Line 20, "an outside" should read --the outside--.

COLUMN 12:
Line 25, "that an" should read --where a--.
Line 41, "directly" should read --direct--.

COLUMN 13:
Line 16, "becomes" should read --enters into--.
Line 30, "becomes" should read --enters into--.
Line 43, "becomes" should read --enters into--.

Signed and Sealed this

Eleventh Day of May, 2010

David J. Kappos
*Director of the United States Patent and Trademark Office*

COLUMN 14:
Line 7, "a" should read --one--.
Line 34, "a" should read --one--.

COLUMN 15:
Line 30, "cause" should read --occur--.
Line 42, "stator 4," should read --stator 3,--.

COLUMN 16:
Line 3, "stator 5." should read --rotor 5.--.
Line 42, "cause" should read --occur--.

COLUMN 19:
Line 21, "disk blank-shaped" should read --blank disk-shaped--.
Line 64, "bearing 24" should read --bearing 30--.

COLUMN 20:
Line 53, "rotator" should read --rotor--.
Line 61, "First," should read --Next,--.

COLUMN 21:
Line 18, "rotator" should read --rotor--.
Line 32, "describe" should read --described--.
Line 33, "view" should read --views--.

COLUMN 23:
Line 30, "stator 28" should read --stator 29--.

COLUMN 25:
Line 16, "cause" should read --occur--.
Line 18, "cause," should read --occur--.
Line 42, "electromagnet" should read --electromagnetic--.
Line 66, "flow" should read --flows--.

COLUMN 26:
Line 23, "flow" should read --flows--.